Aug. 13, 1968  M. K. BUCHNER  3,396,770
METHOD OF AND APPARATUS FOR PREPARING FRUIT
Filed March 24, 1966  14 Sheets-Sheet 1
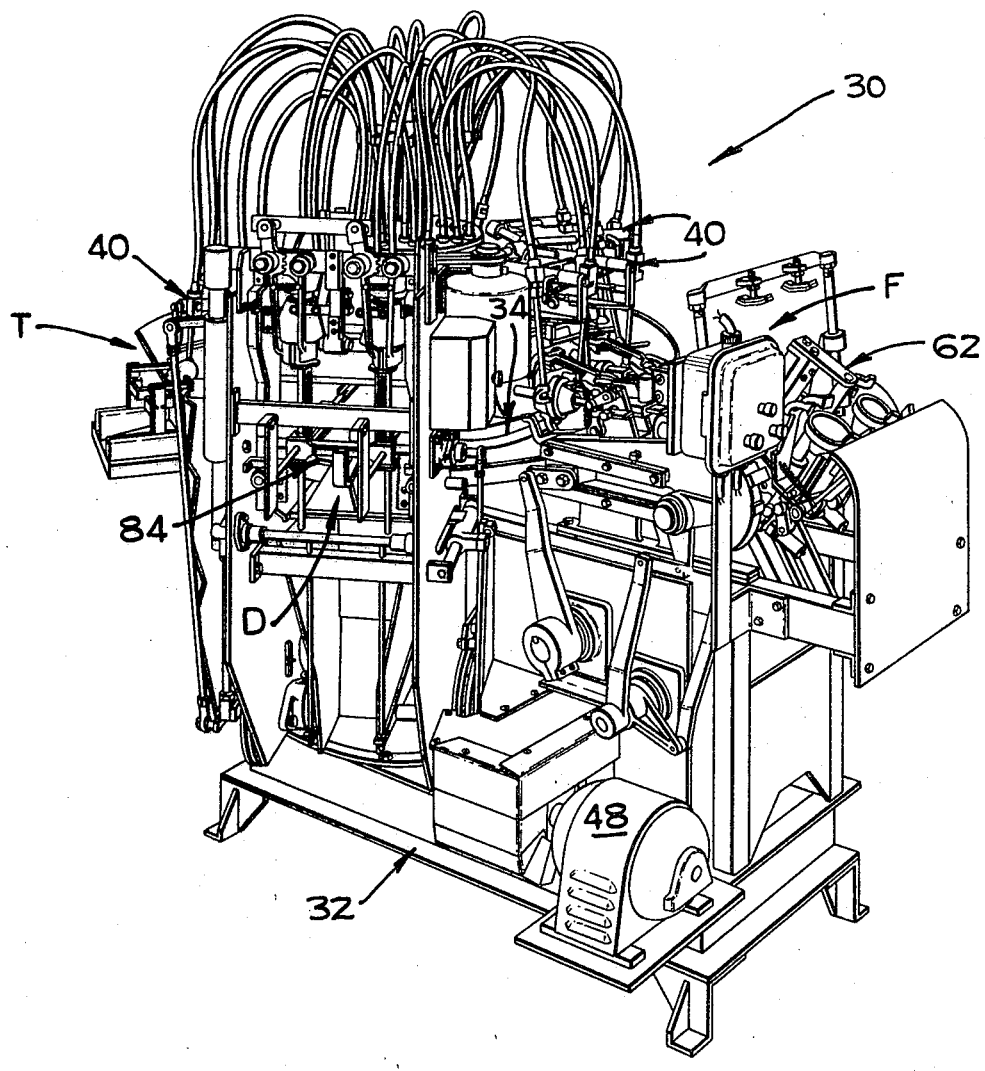
INVENTOR
MARVIN K. BUCHNER
BY Francis W. Anderson
ATTORNEY

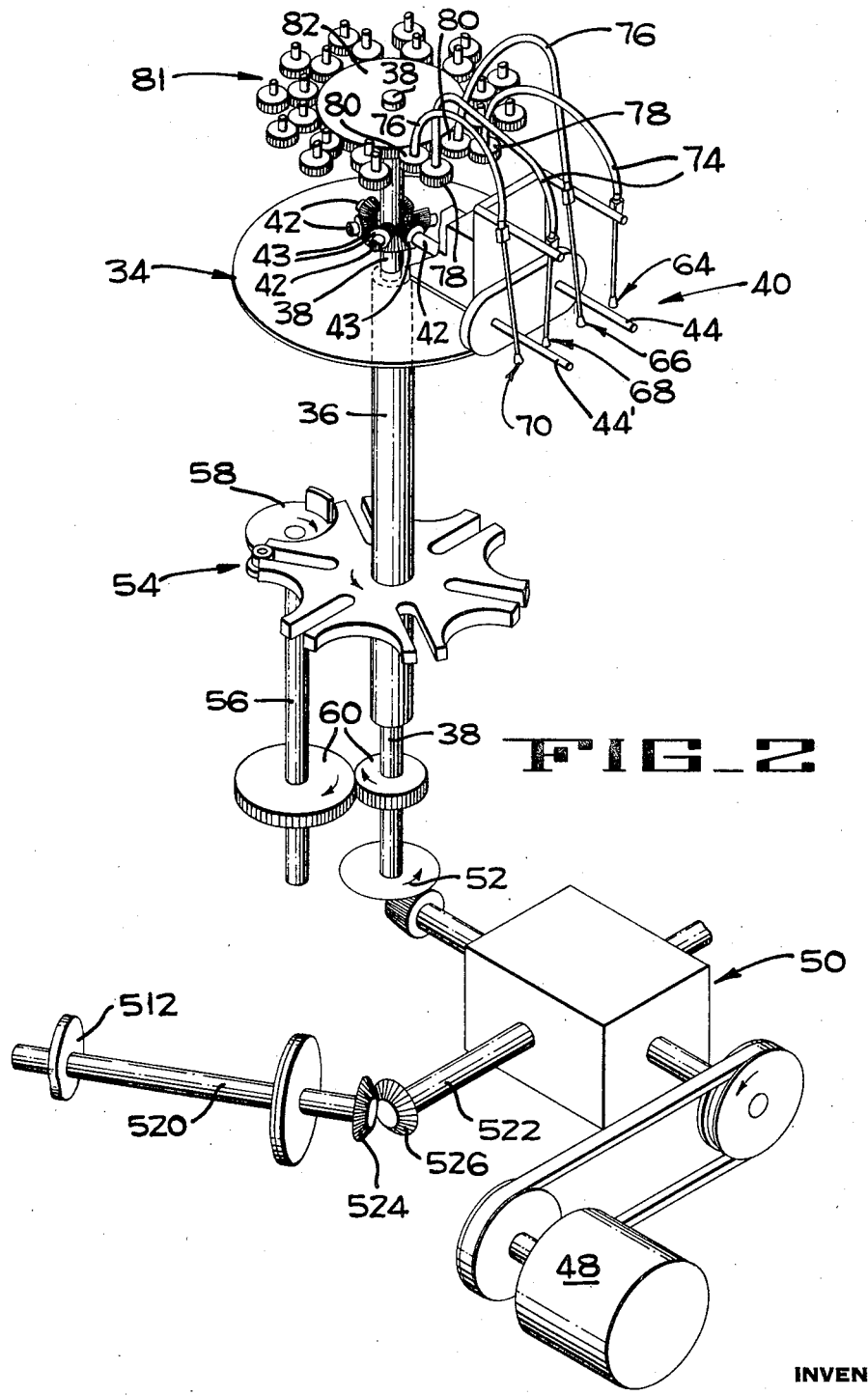

Aug. 13, 1968 — M. K. BUCHNER — 3,396,770
METHOD OF AND APPARATUS FOR PREPARING FRUIT
Filed March 24, 1966 — 14 Sheets-Sheet 3
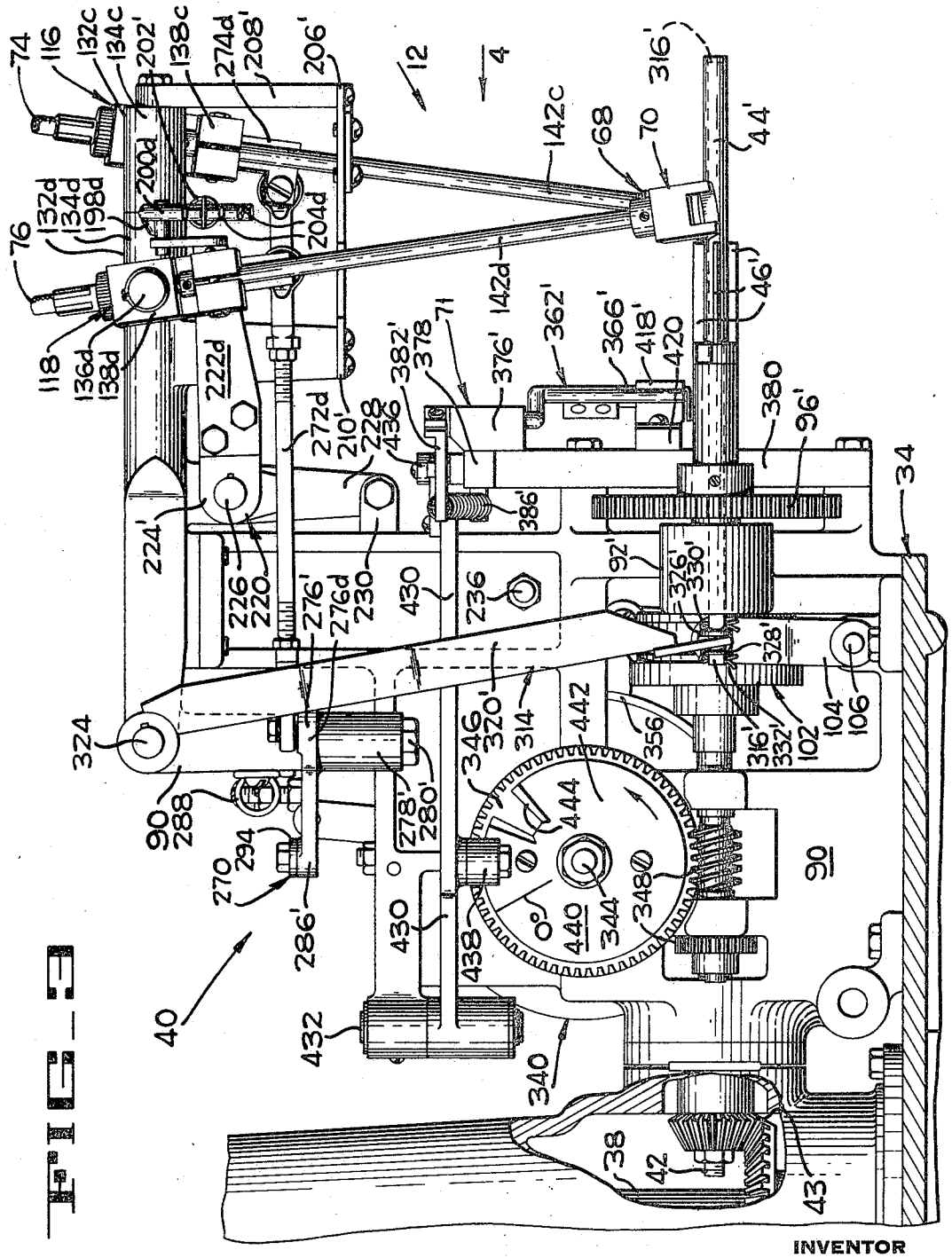
INVENTOR
MARVIN K. BUCHNER
BY Francis W. Anderson
ATTORNEY

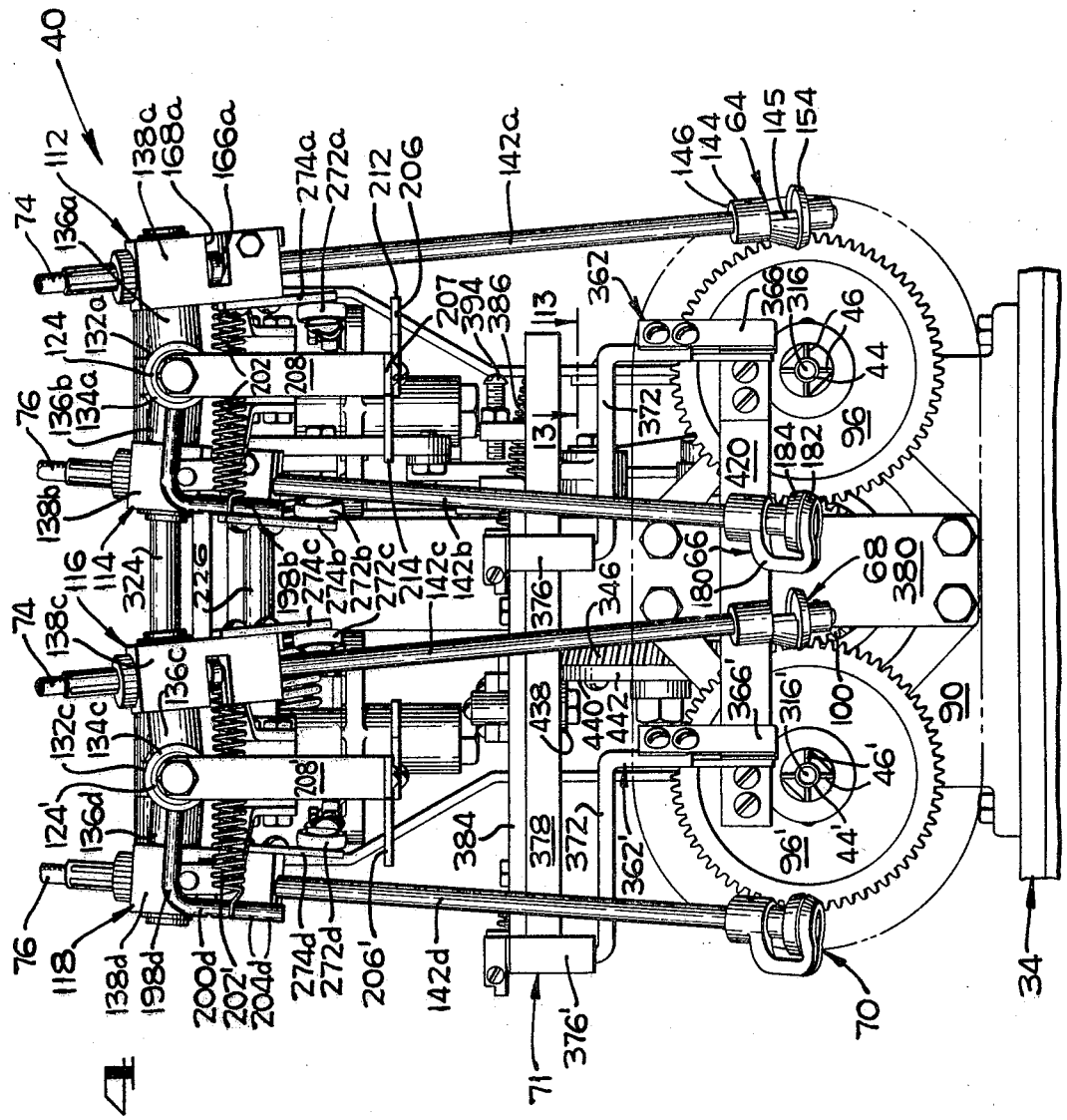
FIG_4

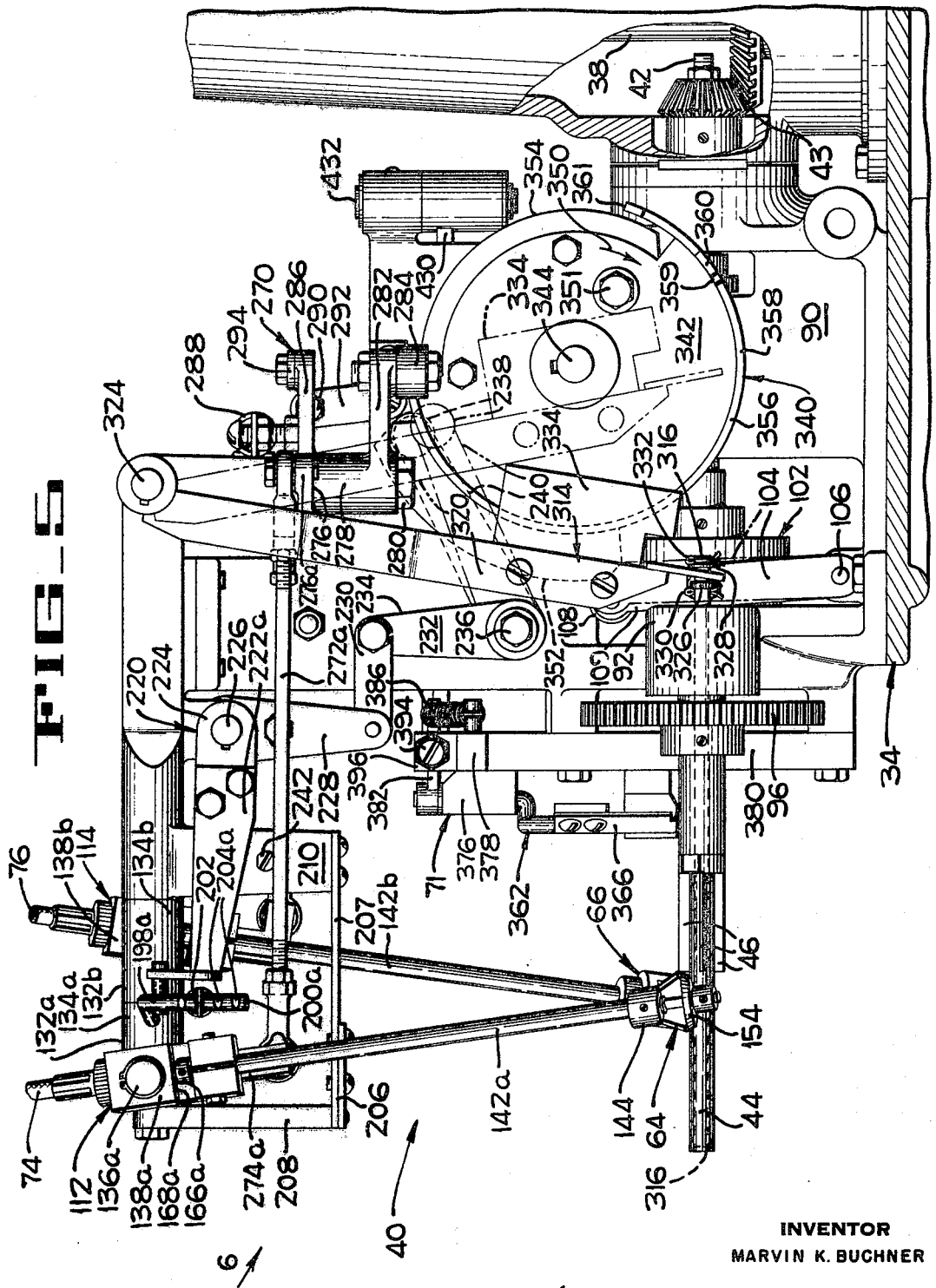

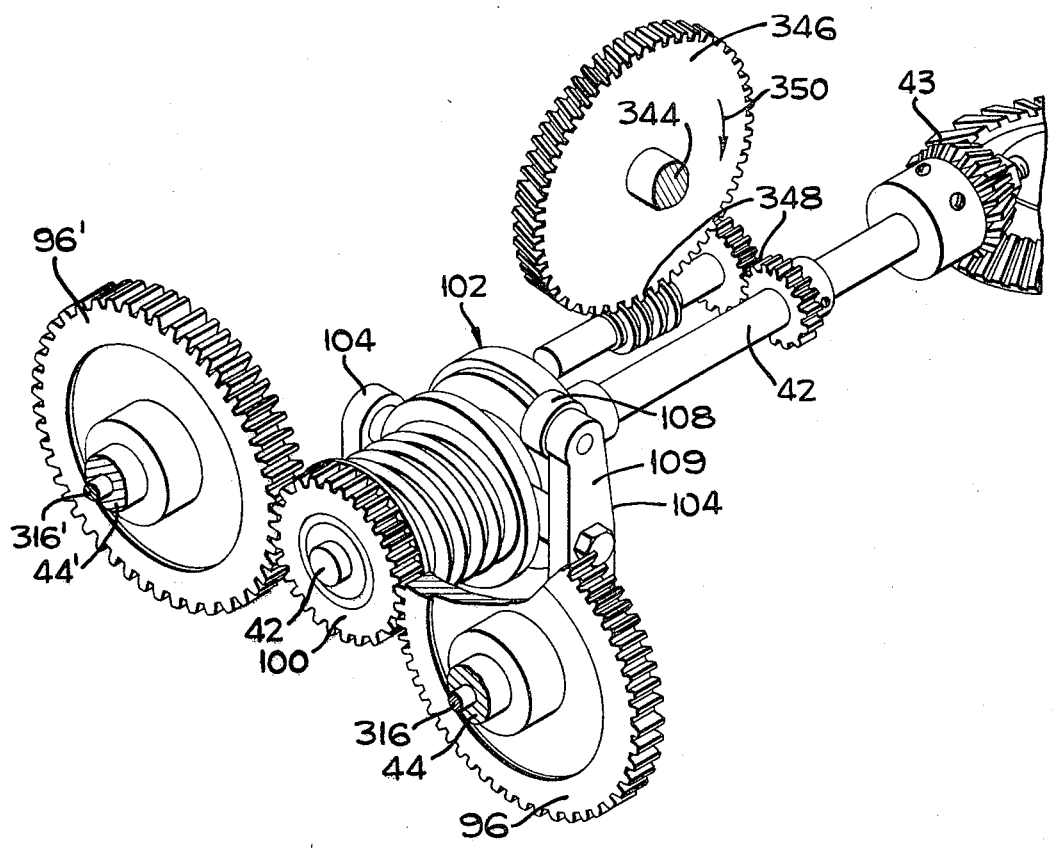

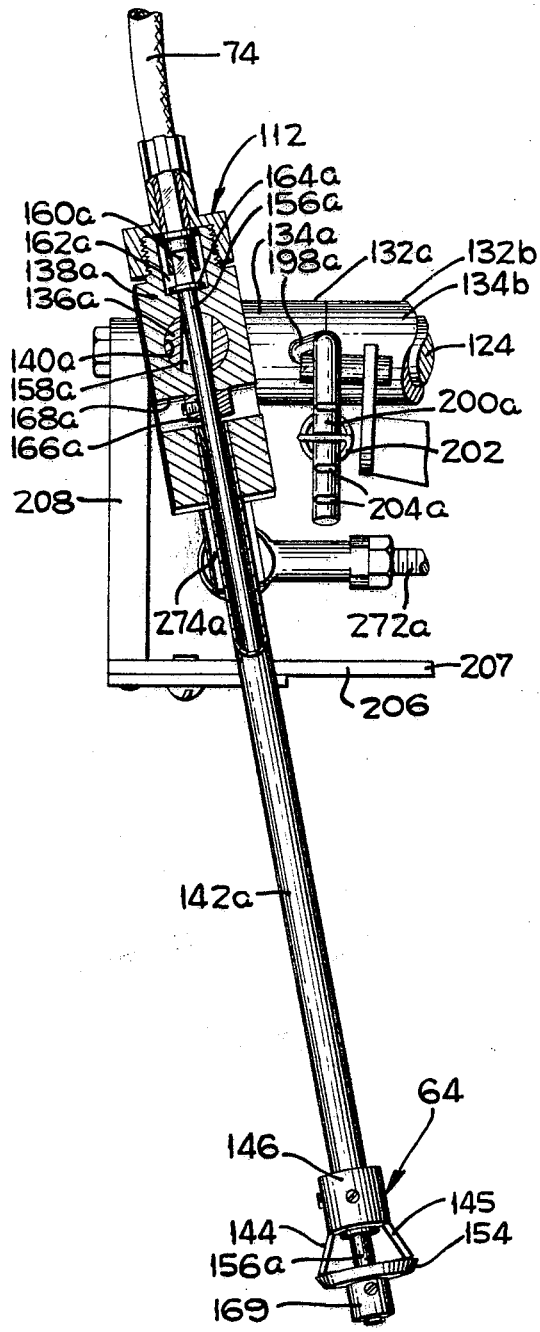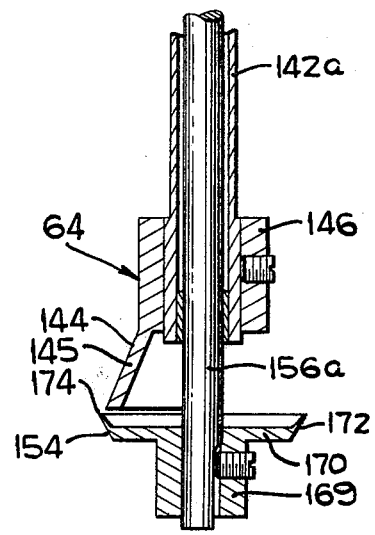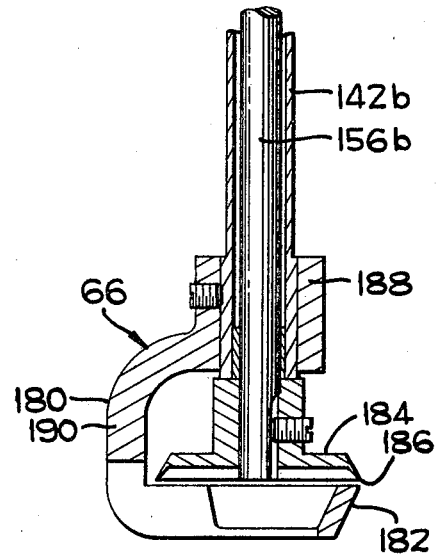

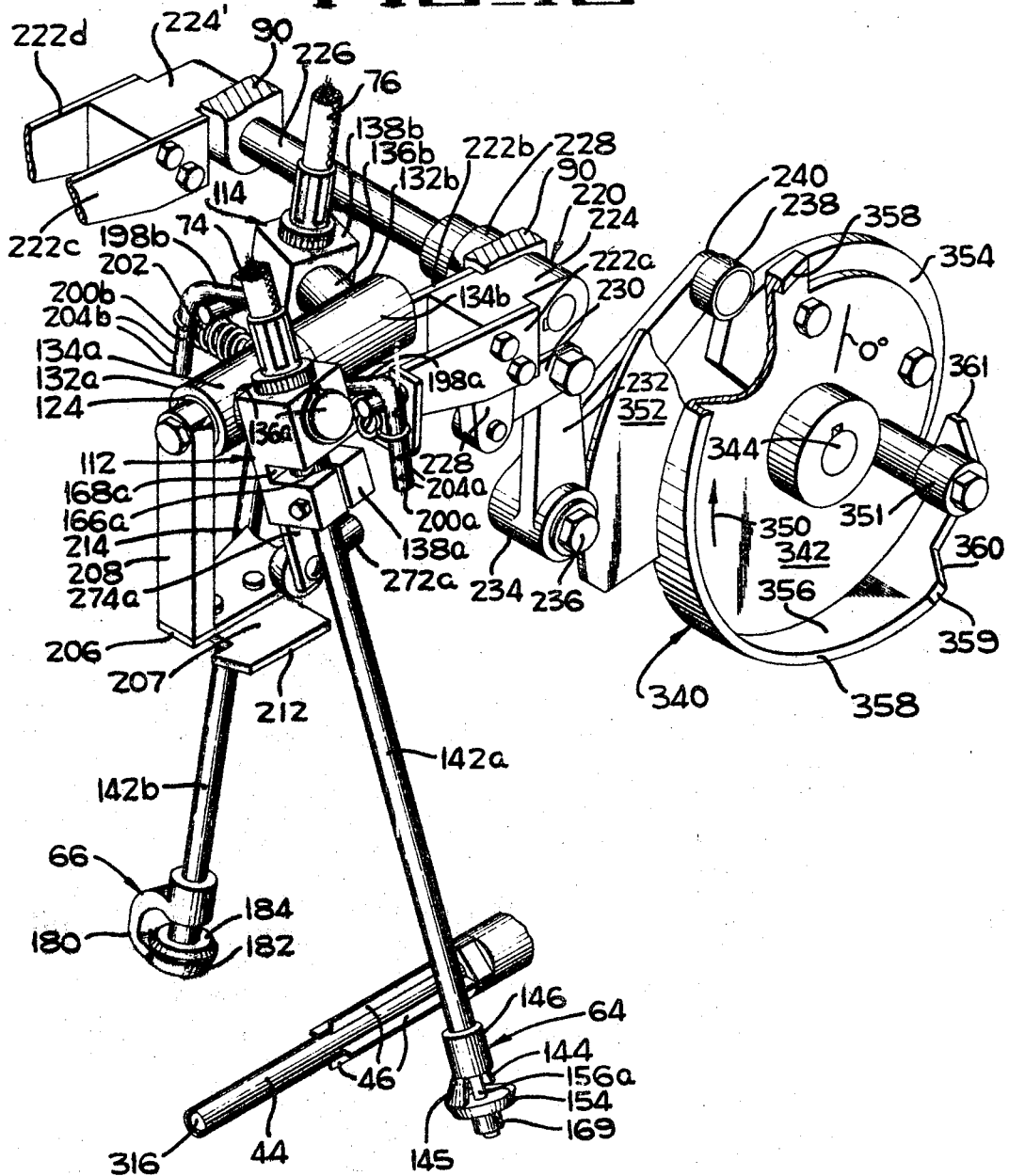

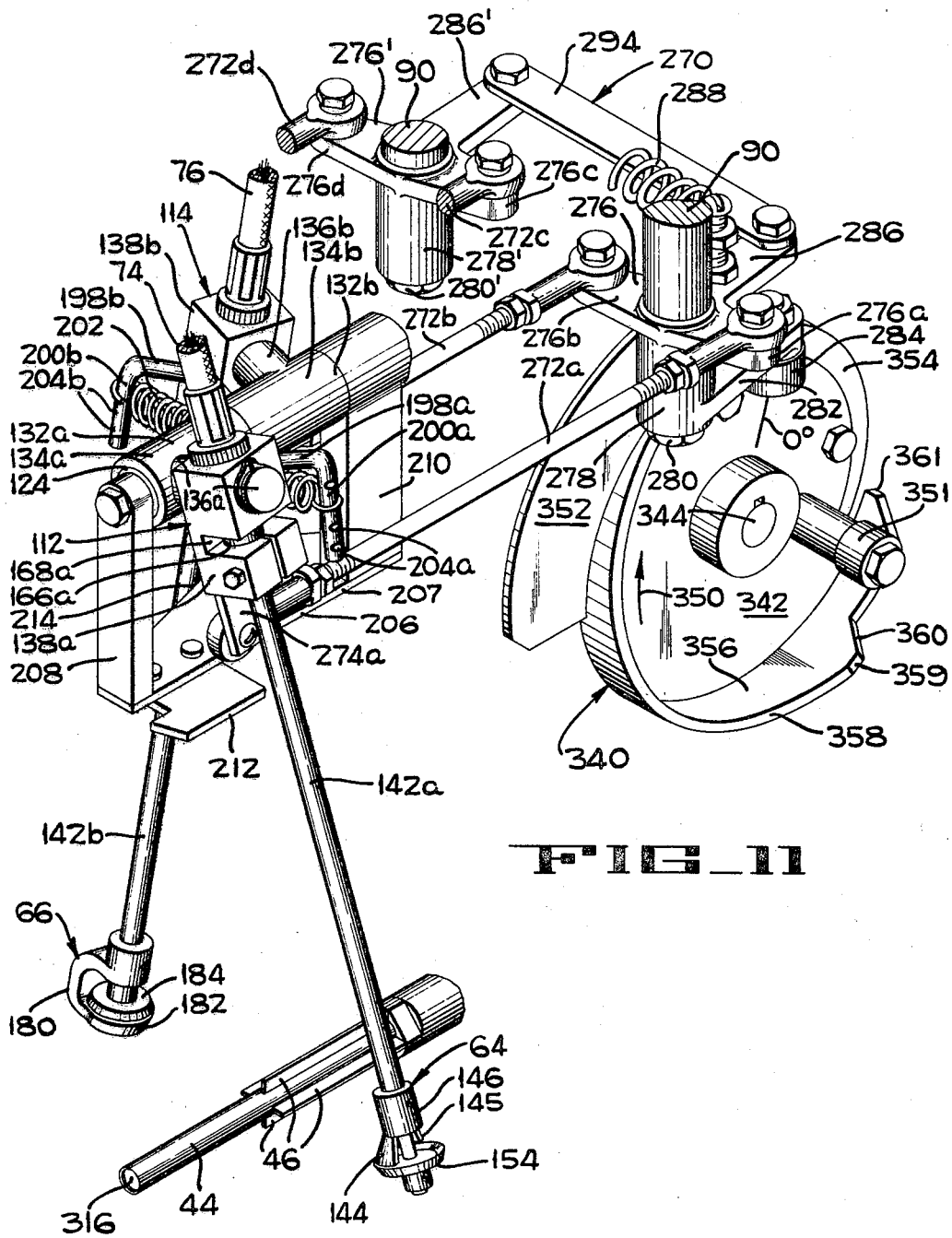

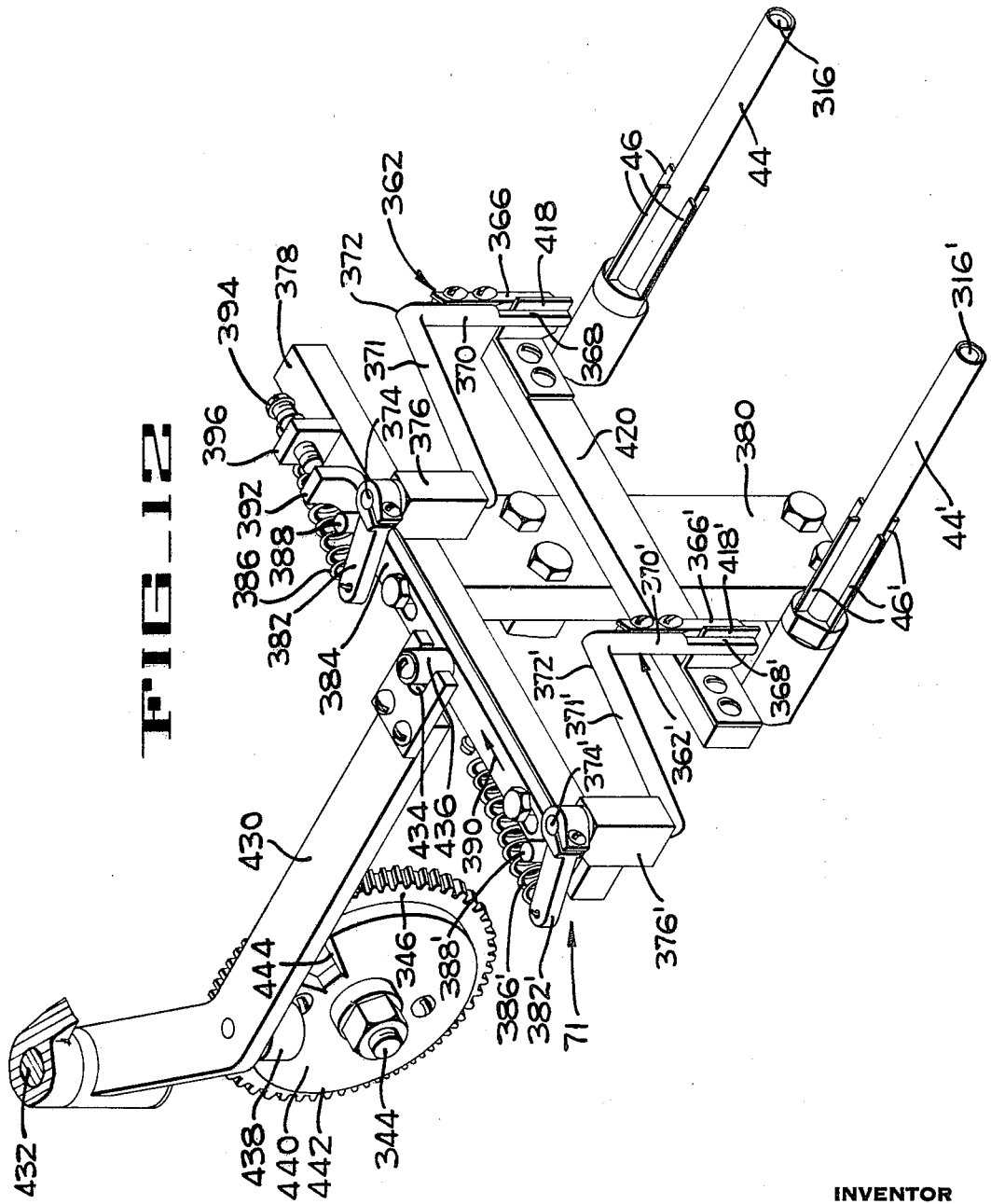

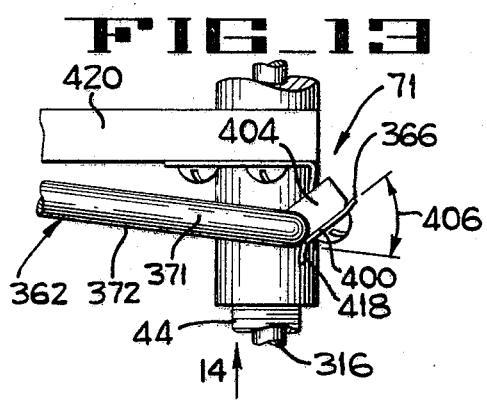
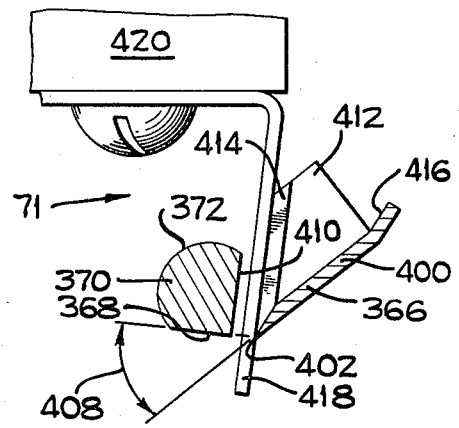
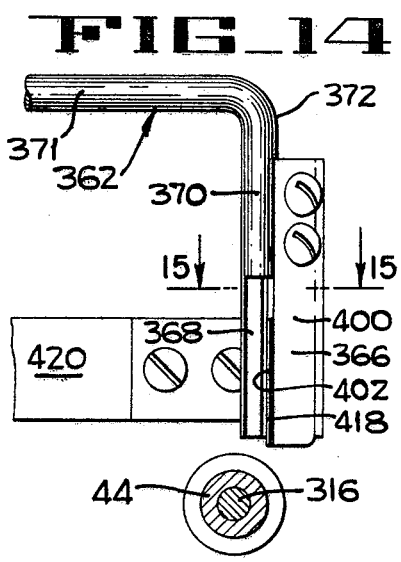
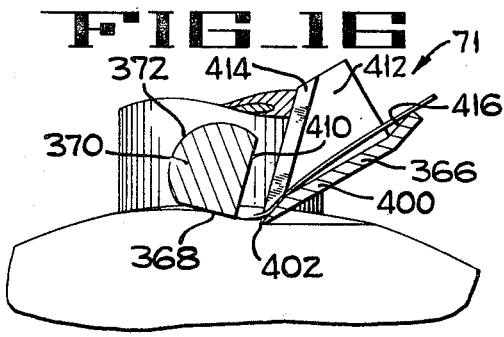
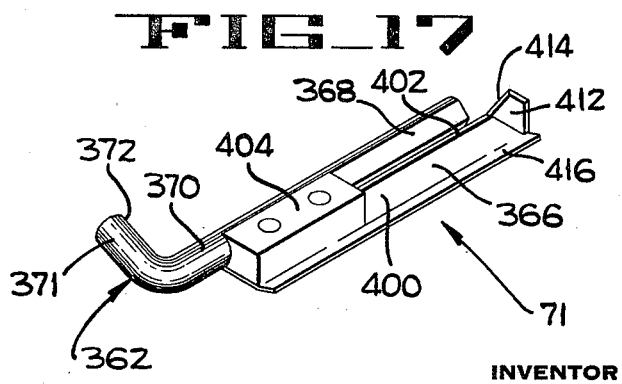
INVENTOR
MARVIN K. BUCHNER

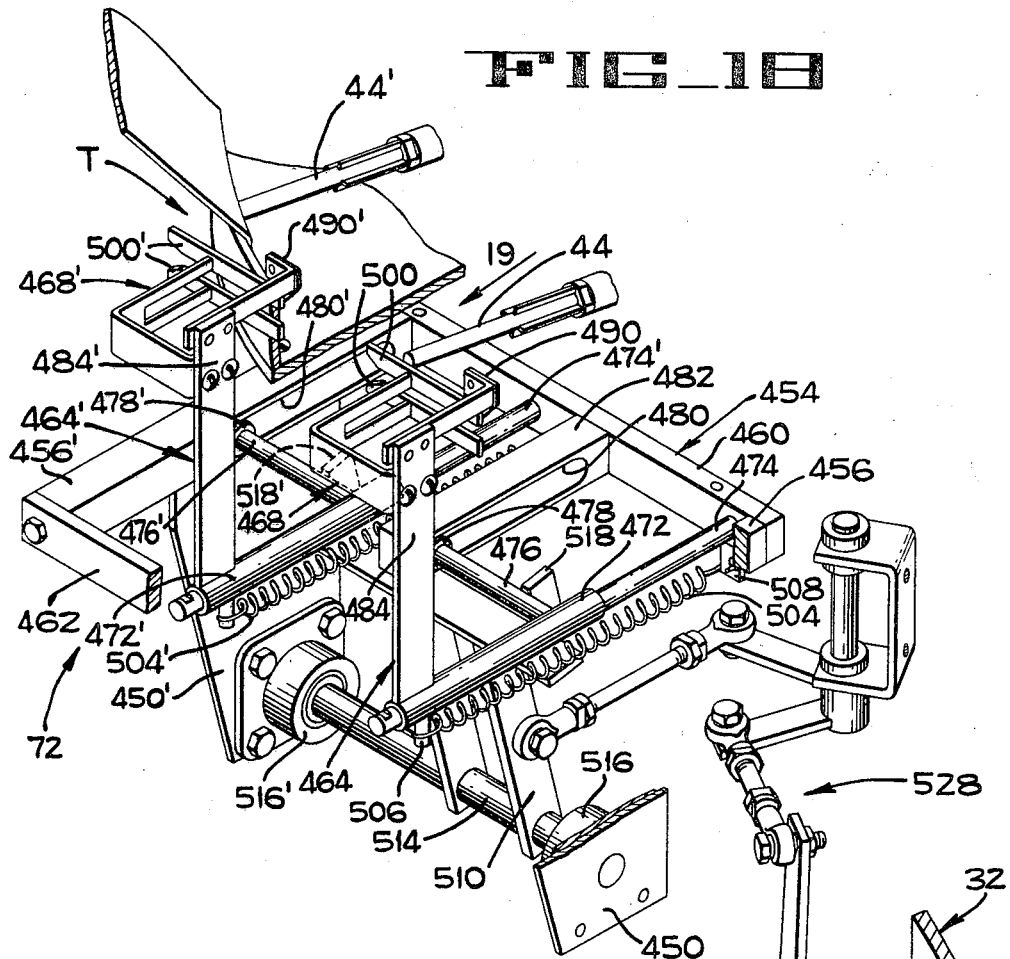
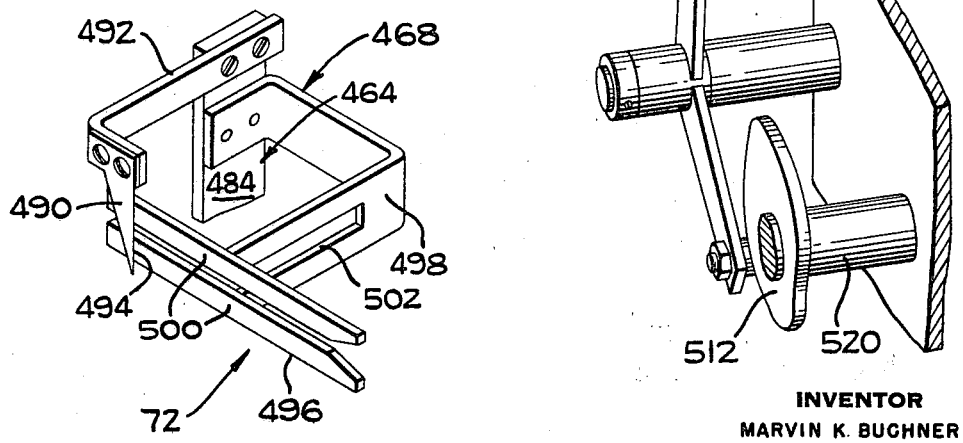

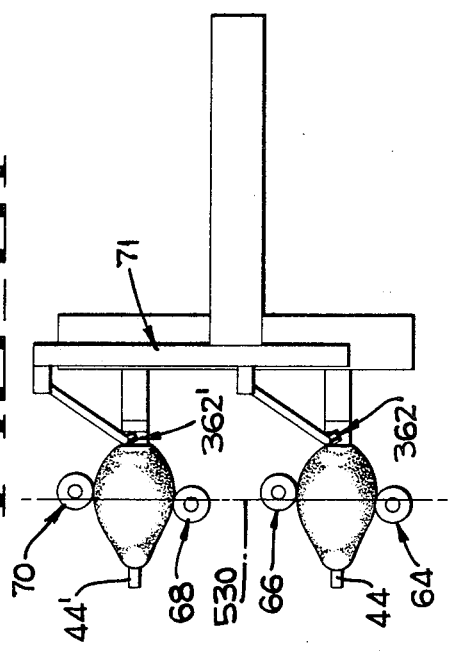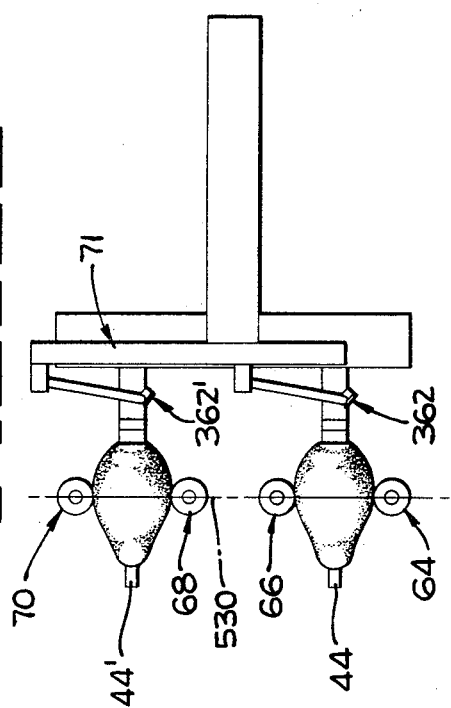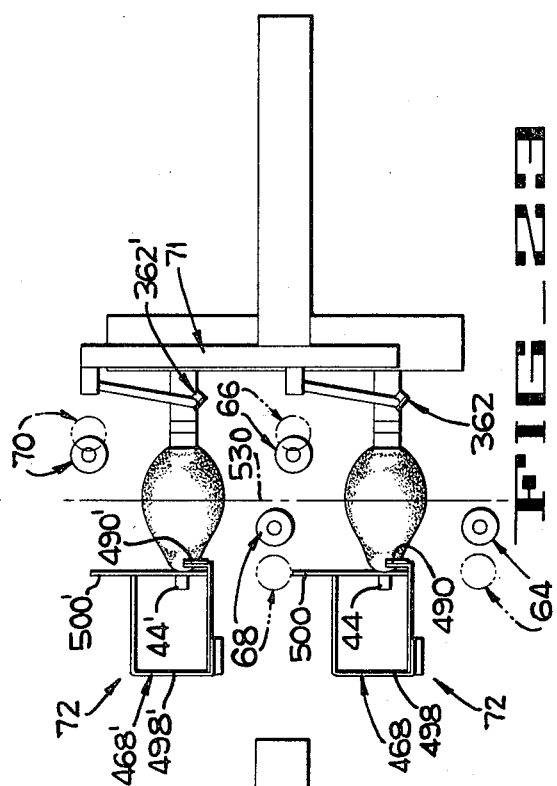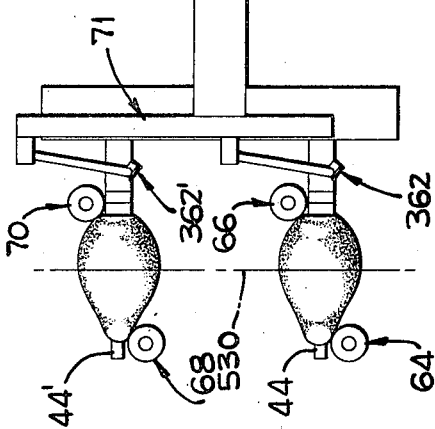

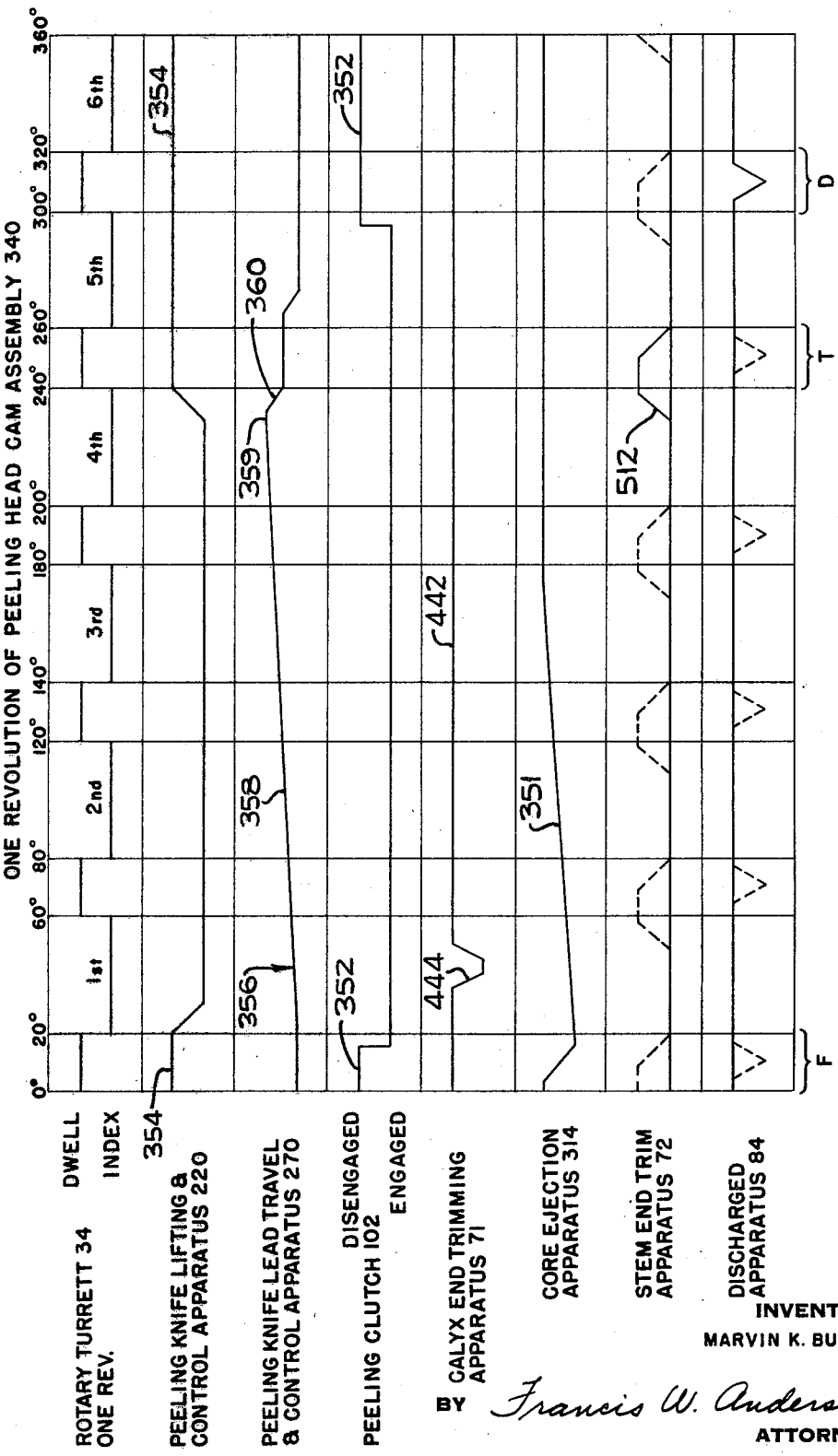

United States Patent Office 3,396,770
Patented Aug. 13, 1968

3,396,770
METHOD OF AND APPARATUS FOR
PREPARING FRUIT
Marvin K. Buchner, San Jose, Calif., assignor to FMC
Corporation, San Jose, Calif., a corporation of Delaware
Filed Mar. 24, 1966, Ser. No. 537,184
8 Claims. (Cl. 146—241)

ABSTRACT OF THE DISCLOSURE

Pear preparation apparatus in which two live peeling knives are used to peel a pear that is impaled upon and rotated by an impaling tube. The knives start the peeling operation at the area of largest diameter and progress, respectively, toward different ends of the pear. While the pear is rotating and is stabilized by the action of the knives against endwise displacement on the impaling tube, a blossom end trimming operation is performed and, synchronized with the removal of the knives from the fruit at the end of the peeling operation, a stem end trimming operation is performed on the rotating pear while it is on the impaling tube.

---

The present invention appertains to methods of and apparatus for preparing pears for canning and more particularly relates to an improved method of and apparatus for peeling and end trimming pears.

In one known pear preparation machine each pear is peeled by the use of a single peeling blade having a convex cutting edge which is disposed with the axis thereof extending, in general, at a right angle to the stem-blossom axis of the pear being peeled. As the pear is rotated about its stem-blossom axis by a stemming tube, on which the pear is impaled, the peeling blade is held in resilient peeling engagement with the pear and is advanced therealong from one end to the other. In this way, a continuous spiral peeling cut is made throughout the length of the pear, to remove the peel.

Since pears usually have surface imperfections such as bumps and hollows and in many instances are not symmetrical, a cross-section of a high percentage of pears will not be circular or, if generally circular, their surfaces will not be concentric about their stem-blossom axes. Thus, the peeling blade of the type mentioned is frequently moved an appreciable extent radially of the pear during each revolution thereof during the peeling operation. Therefore, the rate at which the pear can be turned during the peeling operation must be kept below a speed at which portions of the pear's surface, due to its non-symmetrical configuration and bumps, will strike the peeling blade with such force as to thrust the same outward momentarily, out of peeling engagement with the pear each time the pear rotates. Additionally, the pear must turn slowly enough to prevent other portions of the pear's surface, in any hollows there may be, from receding from the peeling blade at a faster rate than the blade is urged toward the pear in order to maintain peeling engagement between the blade and the pear. It will be apparent, therefore, that if the pear is turned too rapidly, there will be areas of the peel remaining on the otherwise peeled pear regardless of whether the peeling blade is thrust outward, out of engagement with the pear, or whether it fails to move inward fast enough to maintain engagement with the pear in the region of a hollow. Practical considerations of production capacity as well as the size of the machine employing a single peeling blade for each pear, necessitate that since the pears must turn slowly, the single peeling blade has only a short time in which to completely peel the pear during an operating cycle. Therefore, a wide and consequently a thick peel cut must be taken from each pear in order that use of the known machine will be economically feasible. For these reasons, a certain amount of edible flesh or meat of the pears peeled by machines of the type mentioned is wasted. As a further consequence of this wide and thick peel cut, the fully prepared pears are deeply grooved which results in a canned product of sub-choice grade.

Due to the pressure applied to the pear by the single peeling blade during the peeling operation performed in the machine mentioned above, the blade is apt to push the pear a short distance in first one direction and then in the other, axially of the stemming tube or impaling spindle on which it is impaled, as the blade ascends and descends the bulb portion of the pear. Any axial movement of the pear at such a time will cause the blade to momentarily reduce its pressure on the pear and cause the blade to skip or to make an unusually shallow cut. Such action will result in strips of peel remaining on the surface of the pear between adjacent convolutions of the spiral pulling cut.

While the single peeling blade, mentioned above, advances along the pear, the blade is forced or cammed outward from the stem-blossom axis by the pear itself as the blade moves from a small diameter portion toward the largest diameter portion of the pear, against the force by which the blade is retained in resilient peeling engagement with the pear. Under such conditions the peeling blade is apt to cut more deeply than usual and to gouge and bruise the fruit meat in this region of the pear.

Therefore, an object of the present invention is to provide an improved pear preparation machine.

Another object is to provide an improved method of preparing pears.

Another object is to provide an improved pear preparation machine capable of spirally peeling pears in such a way as to produce prepared fruit of relatively high grade.

Another object is to provide pear peeling apparatus which is capable of taking a narrow and consequently shallow peel cut from a pear rotating at a certain speed to completely peel the pear in substantially the same length of time heretofore required while taking a wide and consequently deep peel cut.

Another object is to provide a pear peeling method by which two peeling operations, performed simultaneously, proceed in opposite directions lengthwise of a pear rotating about its stem-blossom axis.

Another object is to provide a pear peeling method in which two peeling operations, performed simultaneously, proceed in opposite directions lengthwise of a pear from adjacent the largest diameter area of the pear during rotation of the pear about its stem-blossom axis.

Another object is to provide pear preparation apparatus in which dual peeling means capable of making spiral peel cuts while being advanced lengthwise of a pear, are moved in opposite directions during relative rotation between the pear and the peeling means about the stem-blossom axis of the pear to peel the pear.

Another object is to provide fruit peeling apparatus including dual peeling means which progress in opposite directions from adjacent the largest diameter area of the fruit along oppositely sloping surface areas thereof toward the stem-blossom axis of the fruit during the peeling operation.

Another object is to provide pear peeling apparatus in which dual pear peeling means move along oppositely inclined surface areas of a pear toward the stem-blossom axis of the fruit.

Another object is to provide fruit preparation apparatus in which dual fruit peeling means and a fruit to be peeled thereby rotate relatively to each other about an axis of the fruit during the peeling operation, the peeling means employing the fruit's configuration in such a way as to apply opposed and substantially equal forces against the fruit to counteract the tendency that either of said opposed forces would have to shift the fruit along said axis.

Another object is to provide fruit preparation apparatus in which the fruit is rotated about an axis while opposed forces, applied to the fruit in performance of a peeling operation, stabilize the fruit against axial movement during the calyx-end trimming operation.

Another object is to provide pear preparation apparatus in which the calyx-end of a pear is trimmed while peelers, movable lengthwise of the pear, are moved in opposite directions along the pear during relative rotation between the pear and the peelers about the stem-blossom axis of the pear to peel the pear.

Another object is to provide improved calyx-end trimming apparatus in a pear preparation machine.

These and other objects and advantages of the present invention will become apparent from the following description taken in connection with the accompanying drawings, in which:

FIGURE 1 is a perspective of a pear preparation machine incorporating the apparatus of the invention by which the present method is carried out.

FIGURE 2 is a schematic perspective of the power train of the pear preparation machine seen in FIGURE 1, as viewed in approximately the same direction.

FIGURE 3 is an enlarged left side elevation of the peeling head shown in FIGURE 2, with the parts in the position they would assume immediately preceding a pear peeling operation.

FIGURE 4 is an outer end elevation of the peeling head as viewed in the direction indicated by the arrow 4 of FIGURE 3.

FIGURE 5 is a right side elevation of the peeling head shown in FIGURES 3 and 4.

FIGURE 6 is a perspective, showing a portion of the power train of the peeling head, as viewed in the direction indicated by the arrow 6 of FIGURE 5 from a position above in the right side and beyond the outer end of the peeling head.

FIGURE 7 is an enlarged side elevation of a portion of the peeling head seen in FIGURE 5, particularly showing the near peeling knife assembly, partially in axial section.

FIGURE 8 is an enlarged axial section of the near peeling knife assembly seen in FIGURE 5, showing the peeling cutter and closely related structure.

FIGURE 9 is an axial section, similar to FIGURE 8, showing the peeling cutter and closely related structure of the other peeling knife assembly, shown at the far side of FIGURE 5.

FIGURE 10 is a fragmentary perspective showing the two peeling knife assemblies associated with the impaling spindle seen in FIGURE 5, and including the lifting apparatus for controlling the movement of the peeling knife assemblies laterally of the impaling spindle to move the peeling cutters into and out of peeling engagement with a pear on the spindle.

FIGURE 11 is a perspective similar to FIGURE 10, particularly showing the apparatus for moving the peeling knife assemblied lengthwise of the impaling spindle.

FIGURE 12 is a fragmentary perspective particularly showing the two calyx end trimming knives and related operating apparatus of the peeling head shown in FIGURES 3, 4 and 5, as viewed in the direction indicated by the arrow 12 of FIGURE 3, from a position above the left side and beyond the outer end of the peeling head.

FIGURE 13 is an enlarged fragmentary plan of a portion of the peeling head and including one calyx end trimming knife in retracted position, as viewed in the direction indicated by the arrows associated with lines 13—13 of FIGURE 4.

FIGURE 14 is an elevation of the structure shown in FIGURE 13, as viewed in the direction indicated by the arrow 14 thereof.

FIGURE 15 is an enlarged horizontal section taken along lines 15—15 of FIGURE 14.

FIGURE 16 is a horizontal section showing the calyx-end trimming knife of FIGURE 15 in projected calyx end trimming position in engagement with a pear on the associated impaling spindle.

FIGURE 17 is a fragmentary perspective showing the present calyx end trimming knife in detail.

FIGURE 18 is an enlarged fragmentary perspective of the stem end trimming station of the machine substantially as seen in FIGURE 1, particularly showing the stem end trimming apparatus and its operating components at a time just preceding the stem end trimming operation.

FIGURE 19 is an enlarged fragmentary perspective of one stem end trimming knife assembly seen in FIGURE 18 and as viewed in the general direction indicated by the arrow 19 thereof.

FIGURES 20, 21, 22 and 23 are fragmentary diagrammatic plans, respectively, showing a sequence of operational positions of the peeling and calyx-end trimming apparatus of one peeling head as they would appear at different stages during one cycle of operation.

FIGURE 24 is a diagram illustrating the timing of the operations involved in the preparation of one pear during a single operating cycle of the pear preparation machine shown in FIGURE 1.

The pear preparation machine 30 (FIG. 1) includes a frame structure 32 in which a rotary table or turret 34 (FIGS. 1–5) is journaled by means of a sleeve 36 (FIG. 2) upon an upstanding drive shaft 38.

Six peeling heads 40 (FIG. 1), only one of which is shown in FIGURES 2–5, are fixed at 60 degree intervals to the rotary table 34, adjacent its circular periphery. Each peeling head 40 includes a horizontal shaft 42 (FIGS. 2, 3, 5 and 6), drivingly connected to the shaft 38 (FIGS. 2, 3, 5 and 6) by bevel gearing 43, to rotate right hand and left hand pear impaling spindles or stemming tubes 44 and 44', respectively (FIGS. 4, 6 and 12), during the pear peeling and end trimming operation. The impaling spindles 44 and 44' are tubular throughout their lengths and are provided with radial fins 46 and 46', respectively, which enter pears which are impaled thereon and assure that the pears so impaled will be rotated with the spindles.

Hereinafter, wherein the peeling head 40 and closely related apparatus include corresponding right and left hand parts, the corresponding left hand parts will be identified by use of the same reference numeral used to identify the right hand part but with a prime suffix mark added.

The drive shaft 38 is connected to a motor 48 by means of a power transmission 50, of well known components, for continuous rotation in the direction indicated by the arrow 52 (FIG. 2), during operation of the machine 30. While the shaft 38 is thus driven, the table 34 is indexed or rotated intermittently in the same direction through 60 degree increments by Geneva gearing 54 which interconnects an auxiliary shaft 56 to the turret sleeve 36. The auxiliary shaft 56, to which the driver 58 of the Geneva gearing is fixed, is journaled in the frame 32, by means not shown, and is connected by gearing 60 to the drive shaft 38 for continuous operation therewith. Therefore, when the machine 30 of FIGURE 1 is in operation, each peeling head 40 is indexed six times along an orbital path during each operating cycle so as to be positioned first at a feed station F, then at a stem end timing station T and finally at a discharge station D.

While a particular peeling head 40 is positioned at station F, pears are fed blossom or calyx end first along their stem-blossom axes into predetermined positions on the associated impaling spindles 44 and 44', respectively, by pear feeding apparatus 62 (FIG. 1). It is to be understood that the particular pear feeding apparatus 62 at station F, forms no part of the present invention and may be of any known type capable of operating in the manner described above.

Rotation of the impaling spindles 44 and 44', which are stationary at the time pears are fed thereonto, commences just prior to the time the peeling head 40 leaves station F, and continues throughout the time the peeling head is indexed four successive times, and has passed the stem end trimming station T. During this advancement of the peeling head, the pears carried by the two spindles 44 and 44' are peeled by pairs of rotary peelers 64, 66 and 68, 70, respectively (FIG. 4), and both the calyx ends and stem ends are trimmed. The calyx trimming operation is performed by a calyx-end trimming apparatus 71 (FIG. 12), forming part of the peeling head 40. As the peeling head 40 closely approaches station T the stem end trimming operation is performed on the pears carried thereby by a stem-end trimming apparatus 72 (FIG. 18).

The individual rotary peelers 64, 66 and 68, 70 of each pair thereof, associated with the impaling spindles 44 and 44', respectively, are connected by flexible shafts 74 and 76 to gears 78 and 80, respectively, of a peeling cutter drive 81 (FIG. 2). It will be noted (FIG. 2) that the gears 78 associated with the rotary peelers 64 and 68 and the gears 80 associated with the rotary peelers 66 and 70 mesh with each other and that all the gears 80 have driving engagement with a common gear 82 which is fixed to the upper end of the main shaft 38. Since the main shaft 38 is driven continuously, during operation of the machine 32, the gears 78 and 80 of each pair thereof will be driven in opposite directions to continuously drive the rotary peelers 64, 68 in one direction and the rotary peelers 66, 70 in the opposite direction.

Following the stem end trimming operation performed at station T, the table 34 is indexed the fifth time to advance the peeling head into registry with station D where the pears, which have been fully peeled and end-trimmed, are withdrawn from the impaling spindles by a pear discharge apparatus 84 (FIG. 1). The pear discharge apparatus 84 forms no part of the present invention and may be of any known type capable of performing the function mentioned above. The peeling head 40, from which the peeled and end-trimmed pears have been discharged at station D, is indexed the sixth and final time into registry with station F. The peeling head 40 has, thus, completed one cycle of operation during one revolution of the rotary table 34 and is again in position at station F to receive two pears which are to be peeled and end-trimmed.

Since, for all practical purposes, all six peeling heads 40 are identical, only one peeling head will be described in detail. Referring to FIGURES 3, 4, and 5, the peeling head 40 shown therein, includes a support member or chassis 90 which is bolted to the table 34 adjacent the periphery thereof, in such a position that the horizontal shaft 42 extends radially from the drive shaft 38. The impaling spindles 44 and 44', which are of well known construction, are journalled at their inner ends (FIGS. 3 and 5) in bosses 92 and 92', respectively, of the chassis 90. When so mounted, the impaling spindles are retained in equally spaced relation at horizontally opposite sides of the axis of the shaft 42 and project outward from the chassis, beyond the peripheral edge of the table, in parallel relation to the shaft 42.

The spindles 44 and 44' have drive gears 96 and 96' respectively, fixed thereto adjacent the bosses 92 and 92'. These gears 96 and 96' are located at opposite sides of and are driven by a common gear 100 (FIGS. 4 and 6) which is freely rotatable on the shaft 42. A spring biased clutch 102 (FIGS. 3, 5 and 6) on the shaft between the gear 100 and the shaft 42, is normally held in engaged condition, thereby retaining the gear 100 in driven relation with the shaft 42 so as to drive the impaling spindles 44 and 44' in a clockwise direction, FIGURES 4 and 6.

A clutch actuating lever 104 (FIG. 5) is pivotally connected to the chassis 90 by a horizontal pin 106 extending transversely of the shaft 42, and a cam follower roller 108 is rotatably mounted on the lever 104 adjacent the outer end of one arm 109. As best understood from FIGURE 5, the lever 104 can be moved between the phantom and full line positions shown therein to operate the clutch. When the actuating lever 104 (FIG. 5) is moved in a counterclockwise direction from the phantom to the full line position the clutch 102 is disengaged. The gear 100 is thereby disengaged from driven engagement with the shaft 42 and rotation of the impaling spindles 44 and 44' and any pears impaled thereon stops.

The rotary peelers 64, 66 and 68, 70 are parts of peeling knife assemblies 112, 114 and 116, 118, respectively, (FIG. 4) which are operatively mounted on the chassis 90. The peeling knife assemblies 112 and 114 are associated with the right hand impaling spindle 44 (FIG. 4), and the peeling knife assemblies 116 and 118 are associated with the left hand impaling spindle 44'. Following the pear feeding operation, and until shortly after the impaling spindles and the pears thereon start to rotate, the peeling knife assemblies associated with both impaling spindles are held in lifted position, in which position the rotary peelers are spaced laterally from the associated spindles. The peeling knife assemblies are then lowered toward the associated impaling spindle so as to bring the rotary peelers 64, 66 and 68, 70, respectively, into resilient peeling engagement with a pear thereon at a location adjacent the largest diameter portion of the pear. Thereafter, during the peeling operation and continued rotation of the pears by the impaling spindles, the peeling knife assemblies 112 and 116 are moved lengthwise of the impaling spindles 44 and 44' so as to advance the rotary peelers 64 and 68, respectively, toward the stem ends of the pears and peel those portions of the pears lying between the largest diameter portions and the stem ends. Simultaneously with this action, the peeling knife assemblies 114 and 118 are moved in the opposite direction lengthwise of the impaling spindles 44 and 44' so as to advance the rotary peelers 66 and 70, respectively, toward the calyx ends of the pears and peel those portions of the pears lying between the largest diameter portions and the calyx ends. During the peeling operation performed by the rotary peelers 66 and 70 on the bulb ends of the pears, the calyx trimming apparatus 71 operates to trim the peel from the calyx ends of the pears.

It will be apparent that the rotary peelers 64, 66 and 68, 70 of each pair thereof apply or impose opposed forces on the pear, substantially axially thereof, while being advanced in opposite directions along surface areas of the pears, due to the fact that the pears slope in opposite direction from their largest diameter portions toward their stem-blossom axis. These forces stabilize the pears against axial movement on the impaling spindles. When the pears are fully peeled and the two rotary peelers associated with each impaling spindle reach the opposite ends of the pears, the peeling knife assemblies are lifted by being pivoted transversely of the impaling spindles to move the rotary peelers out of engagement with the pears.

Accordingly, the peeling knife assemblies 112 and 114 are mounted above the impaling spindle 44 for limited pivoting movement on a horizontal stub shaft 124 (FIGS. 4, 7, 10 and 11). This stub shaft is fixed to the upper right hand part of the chassis 90 and projects outward therefrom in vertically spaced parallel relation above the impaling spindle 44. The peeling knife assemblies 116 and 118 (FIGS. 3 and 4) are similarly mounted, but on a stub shaft 124' that projects outward from the chassis 90 at the left hand side thereof in vertically spaced parallel relation above the impaling spindle 44'.

It is to be understood that, with the exception of the rotary peelers 64, and 66 which are different from each other, the peeling knife assemblies 112 and 114 compare closely to each other. Similarly, the peeling knife assemblies 116 and 118 compare closely to each other and to the peeling knife assemblies 112 and 14. Therefore, the construction of the peeling knife assembly 112 only will be described in detail. However, a detailed description of the operation of both peeling knife assemblies 112 and 114 will be given as well as a description of the driving connection between the peeling knife assemblies 112, 114 and 116, 118 for their coordinated operation. Where it is necessary to refer to corresponding parts of the peeling knife assemblies 112, 114, 116 and 118 the same reference numeral followed by the suffix characters a, b, c and d, respectively, will be used.

The peeling knife assembly 112 is pivotally mounted on the stub shaft 124 by a connector 132a, shown best in FIGURES 4, 5, 7, 10 and 11. The connector 132a which has a sleeve portion 134a journaled for rotation on the stub shaft 124, includes a trunnion 136a, projecting to the right (FIGS. 10 and 11) from the sleeve portion 134a at a right angle to the axis thereof. A mounting block 138a of the peeling knife assembly 112 receives the trunnion 136a in a transverse bore 140a (FIG. 7) for pivotal movement of the assembly about the trunnion.

In this way, the connector 132a mounts the peeling knife assembly 112 at the right side of the impaling spindle 44, for universal pivoting movement about mutually perpendicular axes. For this reason, the rotary peeler 64 can be lowered or raised for movement toward or away from the impaling spindle 44, and can be moved lengthwise of the impaling spindle 44 in performing the peeling operation.

The peeling knife assembly 112 (FIG. 7) includes a cylindrical tube 142a, the upper end portion of which is clamped in the lower portion of the mounting block 138a. The tube 142a extends downward from the block 138a to the rotary peeler 64 which is disposed in the region of the impaling spindle 44. The rotary peeler 64 is thus mounted at a height which will enable it to engage a pear on the spindle. A peeling thickness gauge 144 of the rotary peeler 64 (FIGS. 7 and 8) includes a frusto-conical gauging foot 145, projecting downward below the lower end of the tube from a mounting hub 146, which is adjustably secured to the lower end portion of the tube 142a.

A peeling cutter 154 (FIGS. 7 and 8) of the rotary peeler 64 is adjustably and removably secured to the lower end portion of a slender shaft 156a which is journaled in the tube 142a and extends therethrough and through the mounting block 138a. A transverse passage 158a (FIG. 7) in the trunnion 136a, through which the shaft 156a extends, is of appropriate size to enable the peeling knife assembly 112 to be pivoted to a limited extent about the trunnion 136a without interference between the shaft 156a and the trunnion.

The upper end portion 160a of the shaft 156a is of square cross section and projects into an enlarged bore 162a in the block 138a where a shoulder 164a on the shaft 156a is seated against the mounting block 138a at the bottom of the bore. A set collar 166a is removably secured to the shaft 156a in engagement with the mounting block 138a at the upper side of a slot 168a, extending across the mounting block below the bore 140a. Cooperation between the shoulder 164a, the set collar 166a and the block 138a therebetween prevents axial shifting of the shaft 156a in the peeling knife assembly. In this way, variation in the position of the peeling cutter 154 with respect to the gauging foot 146, due to axial movement of the shaft 156a, is prevented. The end portion 160a of the shaft 156a receives the flexible shaft 74 of the drive 81 in mating engagement therewith to rotate the shaft 156a and the peeling cutter 154 thereon during operation of the peeling cutter drive 81.

The peeling cutter 154 (FIG. 8) includes a hub 169 which mounts the cutter 154 on the shaft 156a; and a disc portion 170 at the upper end of the hub that extends radially therefrom. The disc portion 170 has an upturned, peripheral lip 172 of inverted frusto-conical configuration which is sharpened to provide a cutting edge 174 of slightly larger diameter than the adjacent end of the gauging foot 145. During the peeling operation, the rotary peeler 64 is so disposed with respect to a pear that the shaft 156a extends generally transversely of the pear's stem-blossom axis with a gauging foot 145 engaging the rotating pear in such a way that the cutting edge 174 of the cutter 154 penetrates the pear's peeling. While the pear is rotated toward the cutting edge 174 of the rotating cutter 154, as the rotary peeler 64 is advanced lengthwise of the pear, the cutting edge 174 removes the peel from the pear along a spiral path. The thickness of the peel and, consequently, the depth of the peel cut are determined by four factors; the diameter of the cutting edge 174; the lead of the rotary peeler 64; the difference between the diameters of the adjacent end portion of the gauging foot 145 and the cutting edge 174; and the spacing between the adjacent end of the gauging foot 145 and the cutting edge 174.

It will be clear from FIGURES 4, 10 and 11 and the foregoing description, that the peeling knife assembly 114 with the exception of the rotary peeler 66 (FIG. 9), is the same as the peeling knife assembly 112. However, the peeling knife assembly 114 is located on the opposite side of the stub shaft 124 from the peeling knife assembly 112 and the connector 132b is located on the stub shaft 124 between the connector 132a and the chassis 90.

The rotary peeler 66 (FIG. 9) includes a peeling thickness gauge 180 having a gauging foot 182 which functions similarly to the gauging foot 145. In addition, the rotary peeler 66 has a peeling cutter 184 which is similar to the peeling cutter 154. The gauging foot 182 and the peeling cutter 184 have the same relation to each other as do the gauging foot 145 and the peeling cutter 154, however, the gauging foot 182 and the peeling cutter 184 are inverted since the surface of the rotating pear at the left side of the impaling spindle 44 (FIG. 4) moves upward toward the cutter 184 rather than downward as in the case of the rotary peeler 64. Accordingly, the cutter 184 is mounted on the shaft 156b so that its cutting edge 186 is directed downward and the adjacent end of the gauging foot 184 is spaced below the same. The peeling thickness gauge 180 includes a hub 188 which is adjustably secured to the lower end portion of the tube 142b. A curved rib 190, extending in spaced relation past the cutter 184 from the hub 188 to the gauging foot 182, rigidly interconnects the same so as to hold the gauging foot in fixed spaced relation below the cutting edge 186.

The peeling knife assemblies 112 and 114 are resiliently urged to pivot in opposite directions toward each other (FIGS. 4 and 10) so as to move the rotary peelers 64 and 66 thereof toward the impaling spindle 44. Moreover, the resilient force urging the rotary peelers 64 and 66 toward each other is adjustable so that the force with which the rotary peelers 64 and 66 engage the surface of the pear during the peeling operation can be varied. Accordingly, L-shaped arms 198a and 198b, which project from the sleeve portions 134a and 134b, respectively, are provided on the connectors 132a and 132b. These arms project from the sleeve portions 134a and 134b in the same directions as do the associated trunnions 136a and 136b and have downwardly directed end portions 200a and 200b, respectively, which are interconnected by a coiled tension spring 202. The arm portions 200a and 200b have notches 204a and 204b, respectively, which receive and removably retain the looped ends of the spring 202 in adjusted positions therealong. By moving the ends of the spring 202 along the arm portions 200a and 200b from one set of notches 204a and 204b to another, into positions which are nearer to or farther from the axis of the stub shaft 124, the effective lengths of the arms 198a and 198b are shortened or lengthened and the force applied by the spring 202, in pivoting the knife assemblies 112 and 114, is varied for the purposes set forth above.

Similarly, L-shaped arms 198c and 198d are provided on the connectors 132c and 132d, respectively by which the peeling knife assemblies 116 and 118 are mounted for pivotal movement. These arms project from the sleeve portions 134c and 134d in the same directions as do the associated trunnions 136c and 136d and have downwardly directed end portions 200c and 200d, respectively, which are interconnected by a coiled tension spring 202'. The arm portion 200c has notches (not shown) and the arm portion 200d has notches 204d which receive and removably retain the looped ends of the spring 202' in adjusted position to vary the force applied by the spring 202' in pivoting the knife assemblies 116 and 118, as explained above in connection with the knife assemblies 112 and 114.

When the peeling knife assemblies 112 and 114 are moved toward each other by the spring 202, the rotary peeler 64 and 66 would strike the impaling spindle 44 when no pear is impaled thereon, unless prevented by a stop guide 206 as may be understood from FIGURES 4, 10 and 11. The stop guide 206, comprises an elongate member 207 of plate material, rigidly mounted below the stub shaft 124 by legs 208 and 210 which project downward from the outer end of the stub shaft 124 and from the adjacent portion of the chassis 90, respectively. Thus, ward the associated one of the impaling spindles 44 or during the time the peeling operation would normally be performed, the tubes 142a and 142b of the peeling knife assemblies 112 and 114 engage (not shown) and move along opposite, parallel edges 212 and 214 (FIGS. 10 and 11) of the stop guide 206. Therefore, under these conditions, the rotary cutters 64 and 66 are held at a safe distance from the impaling spindle 44. A similar stop guide 206' is provided beneath the stub shaft 124' to cooperate with the peeling knife assemblies 116 and 118 for a purpose correspinding to that described above in connection with the peeling knife assemblies 112 and 114.

Peeling knife assembly control and lifting apparatus 220, shown in FIGURE 10, controls lateral movement of the peeling knife assemblies 112, 114 and 116, 118. It is by this apparatus that the peeling knife assemblies, under the urgency of the springs 202 and 202', are moved toward the associated one of the impaling spindles 44 and 44' at the beginning of the peeling operation, and by which they are positively lifted or moved away therefrom at the end of the peeling operation. The portion of the apparatus 220 associated with the peeling knife assemblies 112 and 114 includes, in addition to the spring 202, two lifting arms 222a and 222b which project along the stub shaft 124 from a mounting hub 224, on a cross shaft 226. The hub 224 is fixed to the cross shaft 226 which is journaled in the chassis 90 (FIGS. 3 and 5). The free ends of the lifting arms 222a and 222b engage beneath the L-shaped arms 198a and 198b, respectively, of the connectors 132a and 132b close to the downwardly directed portions 200a and 200b, respectively. An actuating arm 228 (FIGS. 5 and 10), mounted on and projecting downward from the cross shaft 226 has its outer end pivotally interconnected by a link 230 to one arm 232 of a bell crank 234. The bell crank 234, which is journalled on a cap screw 236 projecting from the chassis 90, has a cam follower roller 238 rotatably mounted on the outer end of its other arm 240.

Other lifting arms 222c and 222d (FIGS. 3 and 10), which are associated with the peeling knife assemblies 116 and 118, extend from the hub 224' on the cross shaft 226 at the left side of the peeling head 40. These arms engage beneath the L-shaped arms 198c and 198d, respectively (only the L-shaped arm 198d being shown, FIGURE 3), of the connectors 132c and 132d. The arms 222c and 222d pivot the peeling knife assemblies 116 and 118 upward in opposite directions against the urgency of the tension spring 202' which is stretched between downwardly directed end portions 200c and 200d of the L-shaped arms 198c and 198d to retract or lift the rotary peelers 68 and 70. In addition, the arms 222c and 222d control downward movement of the peeling knife assemblies 116 and 118 under the action of the spring 202'.

It will be understood that the arm 228 can be secured in angularly adjusted position on the cross shaft 226 with respect to the lefter arms 222a–222d. In this way, their lifting operation can be controlled so as to determine the extent to which the lifter arms will pivot the peeling knife assemblies 112, 114 and 116, 118 upward away from the impaling spindles 44 and 44', respectively.

It will be apparent from the foregoing description, directed to the peeling knife assembly control and lifting apparatus 220, that, when the arm 240 of the bell crank 234 is moved in a counterclockwise direction (FIGS. 5 and 10), from the phantom line position to the dash line position shown in FIGURE 5, the peeling knife assemblies 112, 114 and 116, 118 will be pivoted in opposite upward directions about the stub shafts 124 and 124', respectively. Thus, the peeling knife assemblies are lifted or retracted against the urgency of the springs 202 and 202' from their operative positions close to the impaling spindles 44 and 44' (FIGS. 20–22) to their inoperative or raised positions removed therefrom (FIGS. 4, 10 and 23). These movements of the peeling knife assemblies are performed independently of any pivoting movement of the same about their trunnions 136a–136d. Since the arms 222a–222d are connected to the shaft 226 for concurrent movement, the peeling knife assemblies 112, 114 and 116, will be raised and lowered simultaneously.

An abutment stop 242 (FIG. 5) is provided on the leg 210 for engagement by the lifter arm 222a when the lifter arms are in their lowered positions. Therefore, the lifter arm 222a engages the stop 242 during the time the rotary peelers 64, 66 and 68, 70 are either in peeling engagement with the pears on the impaling spindles 44 and 44' or when the rotary peeler support tubes 142a, 142b, and 142c, 142d engage the stop guides 206 and 206', respectively. This prevents the arms 222a–222d from falling to a position beyond their range of effective operation and positions the cam follower roller 238 of the bell crank 234 in a favorable position for engagement by a cam segment 354, later to be described.

A peeling knife assembly lead travel and control apparatus 270, shown best in FIGURE 11, positively moves the peeling knife assemblies 112, 114 and 116, 118 to advance the rotary peelers 64, 66 and 68, 70 thereof lengthwise of the pears, during the peeling operation, and controls retraction of the assemblies 112, 114 and 116, 118 to their initial positions following the peeling operation. The portion of the apparatus 270 associated with the peeling knife assemblies 112 and 114 includes two links 272a and 272b, of adjustable length, which are pivotably connected at their outer ends to downward extensions 274a and 274b (FIG. 4) of the mounting block 138a and 138b, respectively. The other ends of the links 272a and 272b are pivotably connected to opposite ends 276a and 276b, respectively, of an arm 276 which has a central hub 278. The hub 278 is mounted for pivotal movement on a vertical cap screw 280, projecting downward from the right side of the chassis 90, see FIGURES 5 and 11. Another arm, i.e., arm 282, projecting from the hub 278 at a right angle to the arm 276, has a cam follower roller 284 thereon adjacent to its free end.

Yet another arm, i.e., arm 286, projects from the hub 278, in superposed relation to the arm 282. A coil spring 288, connected under tension between the chassis 90 (FIG. 3) and the arm 286 (FIG. 11), urges the arm 276 in a counterclockwise direction, as viewed in FIGURE 11.

Referring again to FIGURE 11, the spring 288 has urged the arm 276 to the limit of its counterclockwise movement as determined by engagement of the arm 286 with an adjustable limit stop 290, shown in FIGURE 5. The limit stop 290 is screwed into a rigid tongue 292 which is fixed to the chassis 90. When the arm 276 is so positioned, the lengths of the links 272a and 272b are appropriately adjusted so that the rotary peelers 64 and 66 of the peeling knife assemblies 112 and 114 are substantially opposite each other so as to be spaced laterally from the largest diameter portion of a pear impaled in predetermined position on the impaling spindle 44. Upon movement of the arm 276 in a clockwise direction from the position shown in FIGURE 11 by the action of a face cam 356, later to be described more fully, the peeling knife assemblies 112 and 114 are pivoted about the trunnions 136a and 136b in opposite directions, lengthwise of the impaling spindle 44. As a result, the rotary peeler 64 is positively advanced from adjacent the largest diameter area of the pear to the stem end thereof located adjacent the outer end of the impaling spindle 44 to peel the stem end portion of the pear. Simultaneously, the rotary peeler 66 is positively advanced in the opposite direction from adjacent the largest diameter area of the pear to the calyx-end of the pear to peel the inner end portion thereof. After completion of the peeling operation, the peeling knife assemblies 112 and 114 are returned by the action of the spring 288 as it pivots the arm 276 into the position shown in FIGURE 11 with the arm 286 engaging the abutment stop 290 to locate the rotary peelers 64 and 66 in their initial position.

The mounting blocks 138c and 138d of the peeling knife assemblies 116 and 118 are pivotably interconnected with the opposite ends of an arm 276' by links 272c and 272d, respectively, of adjustable length. The arm 276' has a central hub 278' which is journalled on a capscrew 280', projecting vertically downward from the left side of the chasis 90, shown in FIGURE 3. An arm 286', projecting rearwardly of the peeling head 40 from the hub 278', at a right angle to the arm 276', is pivotably interconnected with the arm 286 by a link 294. This assures that the peeling knife assemblies 116 and 118 will be advanced and retracted simultaneously in the same directions and to the same extents as are the peeling knife assemblies 112 and 114, respectively.

Core material entering the impaling spindles 44 and 44', each time a pear is impaled thereon, is ejected therefrom by a core ejecting apparatus 314 having ejector rods 316 and 316', seen best in FIGURES 3 and 5, which are slidable lengthwise in the impaling spindles 44 and 44', respectively. The end portions of the rods 316 and 316', projecting from the inner ends of the impaling spindles, extend loosely through vertical slots (not shown) in the lower end portions of right hand and left hand actuating levers 320 and 320', respectively, which are fixed at their upper ends to the opposite ends of a pivot shaft 324. The pivot shaft 324 extends across the upper part of the peeler head and is journaled in the chassis 90. The slotted lower end of the lever 320 (FIG. 5) is confined on the rod 316 between spaced washers 326 and 328 which are held thereon against further separation by cotter pins 330 and 332, extending through the rod 316. The slotted lower end of lever 320' is similarly confined on the rod 316' between spaced washers 326' and 328'.

The core ejector rods 316 and 316' are moved from their projected core ejecting positions (FIGS. 3 and 5) to their retracted positions (not shown) by the core material entering the impaling spindles 44 and 44' as pears are impaled thereon at station F. A cam plate 334, provided on the lever 320 adjacent its lower end, is engaged during the peeling operation, in a manner to be described later, to thereby advance both levers 320 and 320' and project the ejector rods 316 and 316' and force the core material from the impaling spindles 44 and 44'.

The peeler head 40 includes a cam assembly 340 (FIGS. 5, 10 and 11) by which the core ejector apparatus 314, the clutch actuating lever 104, the peeling knife assembly control and lifting apparatus 220 and the peeling knife assembly lead travel and control apparatus 270, are operated durng each peeling operation. The cam assembly 340 has a mounting disc 342 secured to the right hand end portion of a transverse shaft 344 which is journalled in the chassis 90. The other end portion of the shaft 344 (FIGS. 3, 6 and 12), projects from the left side of the peeler head 40 where a worm gear 346, which is fixed to the end portion of the shaft 344, is drivingly connected by means of gearing 348, in a well known manner, to the contsantly rotating shaft 42. This drive arrangement assures that while the rotary table 34, makes one revolution, the gear 346, and consequently the cam assembly 340 (FIGS. 3, 5, 6, 10, 11 and 12), will also make one revolution in the direction indicated by the arrow 350. The cam assembly 340 being effective to cyclically operate the various, previously mentioned components of the peeler head 40 during operation of the machine 30.

Immediately following the impaling of the pears on the impaling spindles 44 and 44', at the feed station F, the first action of the peeling head 40 to commence is the core ejection, which starts before the rotary table 34 advances the peeling head 40 away from station F. This action is brought about by a cam follower roller 351 (FIGS. 5, 10 and 11), which is rotatably mounted on the disc 342 of the cam assembly 340, as the advancing roller 351 engages the previously mentioned cam plate 334 on the lever 320. Movement of the cam plate 334 swings both arms 320 and 320' to advance both ejector rods 315 and 316' and thereby eject the core material from the impaling spindles 44 and 44'.

Following the start of the core ejection operation but before the rotary table 34 advances the peeling head 40 away from the station F, a clutch operating cam segment 352, which is secured to and projects a uniform radial distance from the disc 342, through a certain angular distance releases the clutch control lever 104. Release of the lever 104 causes the same to pivot in a clockwise direction (FIG. 5) and engage the clutch 102 to thereby connect the impaling spindles 44 and 44' with the rotating shaft 42 to rotate the impaling spindles throughout the pear peeling operation.

Immediately following the start of rotation of the impaling spindles 44 and 44', the peeling knife assemblies 112, 114 and 116, 118 are released for downward pivotal movement about the stub shafts 124 and 124', respectively, under the action of the springs 202 and 202', toward the associated impaling spindle. This action is brought about by the peeling knife assembly lifting and control cam segment 354, which is also secured to and projects a uniform radial distance from the mounting disc 342 through a certain angular distance. When the cam segment 354 releases the arm 240 (FIG. 10), the bell crank 234 is urged in a clockwise direction as the springs 202 and 202' pivot the peeling knife assemblies downward.

The rotary peelers 64, 66 and 68, 70 associated with the impaling spindles 44 and 44', respectively, are next positively advanced in opposite directions lengthwise thereof, by the action of the semicircular face cam 356 which is fixed to the mounting disc 342 in concentric relation. This cam includes a uniform rise 358 that is effective to pivot the arm 276 clockwise (FIG. 11) to thereby constantly advance the rotary peelers associated with each pear from adjacent the largest diameter portions to the opposite ends thereof. Immediately following the start of movement of the rotary peelers lengthwise of the pears, the calyx trimming apparatus 71, which will be described later, comes into operation. At the time the rotary peelers reach the opposite ends of the pears, when the arm 276 has been pivoted to the limit of its clockwise movement, as determined by the highest point 359 of the cam rise 358, the rotary peelers are positively lifted from the pears by the action of the cam segment 354. This latter action occurs simultaneously with the partial return of the rotary peelers to their initial positions adjacent the centers of the pears by the spring 288 as the arm 276 pivots a limited distance in a counterclockwise direction due to a declivity or downward step 360 in the face cam 356.

At the time the intermittently advancing peeling head 40 closely approaches station T and while the rotary peelers thereof are in their lifted and partly retracted positions, the stem end trimming operation is performed by the stem end trimming apparatus 72, to be described later. Thereafter, the rotary peelers are further retracted by the spring 288 to their initial position (FIG. 11) as the arm 276 is pivoted further in a counterclockwise direction when the end 361 of the cam 356 passes out of engagement with the cam follower 284 and the arm 286 engages the abutment stop 290 (FIG. 5). Rotation of the impaling spindles 44 and 44' is next stopped when the clutch operating cam segment 352 engages the cam follower roller 108 of the clutch lever 104 to thereby pivot the same counterclockwise, FIGURE 5, and disengage the clutch 102.

The previously mentioned calyx trimming apparatus 71 (FIGS. 3, 4, 5 and 12), also included the peeling head 40, comprises two trimming knife assemblies 362 and 362', which are associated with the impaling spindles 44 and 44' respectively. It will be noted in FIGURE 12, that the trimming knife assemblies 362 and 362' as well as their mounting and operating apparatus are similar to each other. For this reason, only the trimming knife assembly 362 and the related mounting and operating apparatus will be described in detail.

The trimming knife assembly 362 includes a trimming knife 366 and a peel thickness gauging surface 368, (FIGS. 12–16) to be described later, on the crank pin 370 which depends from the arm 371 of a crank 372. A crank shaft 374 (FIGS. 5 and 12) projects upward from the arm 371 through a bearing block 376 in which it is journalled. The bearing block 376 is secured to a horizontal cross bar 378 of a T-shaped bracket 380 which is bolted to the outer end of the chassis 90 (FIGS. 3, 4, 5 and 12).

An actuating arm 382 is secured for angular adjustment to the upper end portion of the crank shaft 374 and holds the same against downward movement in the bearing block 376. The arm 382 projects from the crank shaft 374 over an elongate bar 384 which is mounted on top of the cross bar 378 for longitudinal sliding movement lengthwise thereof. A spring 386, connected between the free end of the arm 382 and the cross bar 378, urges the arm 382 to pivot the crank 372 clockwise (FIG. 12). In this way, the arm 382 is resiliently retained against an abutment 388 on the slide bar 384 and thereby urges the latter in the direction indicated by the arrow 390 (FIG. 12). Since both calyx trimming knife assemblies 362 and 362' and the means by which they are moved are similar, it will be clear that, upon reciprocation of the slide bar 384, the two assemblies will be pivoted between their retracted positions (FIG. 12) and their projected, calyx trimming positions (FIG. 21).

The fully projected positions of the calyx trimming knife assemblies 362 and 362' are determined by engagement of an upturned end portion 392 of the slide bar 384 (at the right in FIG. 12) with an adjustable stop bolt 394, screwed through an adjacent upstanding boss 396 on the cross bar 378. When the slide bar is urged into engagement with the stop bolt 394 by the springs 386 and 386' the trimming knives 366 and 366' are projected to positions, beyond the positions they would normally have when resiliently engaging the calyx ends of pears impaled in predetermined positions on the impaling spindles 44 and 44'.

Referring to FIGURES 13–17 the trimming knife 366 comprises a flat elongate, rectangular blade portion 400 which is sharpened along the inner side of one elongate side so as to have a cutting edge 402. The trimming knife 366 is bolted at its upper end portion only (FIG. 14) to one surface of a lug 404 (FIGS. 13 and 17), which lug is integral with and projects from the crank pin 370 at an angle of approximately 45° to the crank arm 371, as indicated at 406 (FIG. 13). When the knife 366 is so attached to the lug 404 the cutting edge 402 extends in parallel relation to the crank pin 370 and to the adjacent edge of the gauging surface 368 thereof.

The thickness gauging surface 368 (FIGS. 14 and 15) is an elongate planar area extending axially along the crank pin 370 from adjacent the lug 404 (FIG. 13) to the lower end of the crank pin and is disposed at an angle of 46°, as indicated at 408 in FIGURE 15, to the outer surface of the blade portion 400. Another elongate planar surface on the crank pin 370, i.e., the surface 410 (FIGS. 15 and 16), extends axially along the crank pin from adjacent the lug 404 to the lower end of the crank pin 370 and is at an angle of 90° to the gauging surface 368. The lower end of the trimming knife 366 has a lip 412 (FIGS. 15–17) which projects inward at a right angle from the rectangular blade portion 400. This lip 412 has a cutting edge 414 extending at approximately 45° to the outer surface of the blade portion 400 and is a continuation of the cutting edge 402 (FIG. 17).

When the trimming knife 366 is mounted in the manner described above, the lip 412 and, consequently, the cutting edge 414 thereof (FIGS. 4 and 14) are spaced below the lower end of the crank pin 370. The cutting edge 402 is disposed substantially in the plane of the gauging surface 368 (FIGS. 15 and 16) and is spaced from the plane of the surface 410 to provide clearance between the latter and the cutting edge 402. An inwardly directed deflecting surface 416 of the knife 366 extends along the edge portion of the blade portion 400, opposite the cutting edge 402, as shown in FIGURES 15, 16 and 17. This deflector prevents strips of peel that have been cut from the calyx end of a pear from lying flat against the inner surface of the blade portion to which the cut surface of the peel would normally tend to adhere.

Pieces of peel are apt to catch on the cutting edge 402 of the trimming knife 366 or become jammed between the latter and the surface 410 where they would impair the effectiveness of the knife in performing the calyx trimming operation. In order to prevent such occurrances, a thin rigid tongue 418 (FIGS. 13, 14 and 15) having a width approaching the length of the cutting edge 402 is provided. This tongue 418 enters between the surface 410 and the cutting edge 402 of the trimming knife 366 when the trimming knife assembly 362 is retracted to the position shown in FIGURES 12, 13 and 15, from the calyx end trimming position, FIGURE 16. Accordingly, the tongue 418 is fixed to a mounting bar 420 which is rigid with the stem of the T-shaped bracket 380 and projects along the path followed by the trimming knige 366 as it swings between its projected and retracted positions. It will be noted in FIGURE 12, that a similar tongue 418' cooperates with the trimming knife assembly 362' in the manner and for the purpose described above in connection with the trimming knife assembly 362.

The slide bar 384 is reciprocated by a lever 430 (FIG. 12) so as to swing the two trimming knife assemblies 362 and 362' back and forth, in performing the calyx-end trimming operations. Accordingly, the lever 430 is pivoted at its inner end for horizontal swinging movement on a vertical pin 432 which is fixed to the inner portion of the chassis 90 (FIG. 3). The outer end of the lever 430 has a longitudinally extending slot 434 into which an upstanding stud 436 on the slide bar 384 projects, to operatively connect the slide bar to the lever 430. Therefore, since the springs 386 and 386' urge the slide bar 384 to the right, FIGURE 12, as indicated by the arrow 390, the lever 430 will also be urged in the same direction. For this reason, a cam follower roller 438, rotatably mounted on the under side of the lever 430, is held in resilient engagement with the planar surface portion 440 of a circular face cam 442 which is secured to the outer side of the worm gear 346, in concentric relation (FIGS. 3 and 12). When the lever 430 is so positioned, the slide bar 384 is at the lefthand end of its path of travel (FIG. 12) and holds the trimming knife assemblies 362 and 362' in their retracted positions.

A sector shaped opening 444 in the face cam 443 (FIGS. 2 and 12) provides a valley therein that registers with the roller 438 during rotation of the cam by the worm gear 346 and releases the lever 430 for movement by the springs 386 and 386' in a counterclockwise direction, FIGURE 12. Such movement of the lever 430 slides the bar 384 to the right (FIG. 12) and releases the trimming knife assemblies 362 and 362' for pivotal movement from the positions shown in FIGURE 12 into their calyx trimming positions (FIG. 21) where they remain for a period determined by the angular extent of the valley 444. During continued rotation of the cam 442 the valley passes out of registry with the cam follower roller 438 whereupon the lever 430 is swung clockwise (FIG. 12) and the trimming knife assemblies 362 and 362' are returned to their retracted positions by engagement of the pins 388 and 388' on the slide bar 384 with the arms 382 and 382'.

It will be understood that since the face cam 442 and the cam assembly 340 (FIG. 10) are mounted on the shaft 344 for rotation in unison, the various actions performed by the peeling head 40 and controlled by these cams occur in synchronism during each pear peeling cycle, which will be fully explained in the description of the operation.

The stem end trimming apparatus 72 (FIGS. 18 and 19), at station T, comprises opposite side plates 450 and 450' which extend vertically in parallel relation to a radius of the drive shaft 38 and are rigid with the frame structure 32 (FIG. 1). A rectangular frame 454 of the apparatus 72, having side bars 456 and 456' fixed to the upper ends of the plates 450 and 450', respectively, and rigidly interconnected at their opposite ends by parallel, inner and outer cross straps 460 and 462, supports two stem end trimming knife carriages 464 and 464'. The carriages 464 and 464' mount stem end trimming knife assemblies 468 and 468', respectively, for sliding reciprocation toward and from the rotary table 34 along paths which are parallel to a radius thereof in performance of the stem end trimming operation.

The carriage 464 comprises a cylindrical, tubular body 472 which is slidable upon a fixed shaft 474 extending in parallel relation to the side plates 450 and 450' between the straps 460 and 462. A stud 476 projecting laterally from the inner end portion of the body 472, has a roller 478 rotatably mounted at its outer end. The roller 478 is confined for guided movement in a straight guide slot 480 provided in the adjacent side of a bar 482. The bar 482 is secured to the strap 460 and projects outward therefrom in parallel relation to the shaft 474. Guided movement of the roller 478 in the slot 480 enables the carriage 464 to reciprocate along the shaft 474 without the possibility of rotation thereabout. An arm 484, projecting rigidly upward from the outer end portion of the body 472, mounts the stem end trimming knife assembly 468 at the proper height to operate upon the stem end of a pear on the impaling spindle 44 at station T.

It will also be noted in FIGURE 18 that the slot 480' in which the roller 478' of the carriage 464' is confined for guided movement differs from from the slot 480 only in that the slot 480' is formed in the side bar 456'.

A cut-off knife 490 (FIGS. 18 and 19) of the stem end trimming knife assembly 468 is mounted on the arm 484 in fixed, inwardly spaced relation by a bracket 492. The knife 490, when so disposed, is mounted for horizontal reciprocating movement along a path parallel to a radius of the table 34 at the height of the impaling spindle 44 to cooperate therewith as the peeling head 40 approaches and is in indexed position at station T. At the time the peeling head is in indexed position at station T a vertical cutting edge 494 of the knife 490 extends in a vertical plane which is substantially tangent to the leading side of the impaling spindle 44.

A depth gauge 496, for determining the amount to be cut from the stem ends of pears by the knife 490 is mounted on the arm 484 in rigid outwardly spaced relation with respect to the knife 490 by a bracket 498. The depth guage 496 comprises a pair of straight, elongate runners 500 which extend horizontally at right angles to the impaling spindle 44, when the peeling head 40 is positioned at station T, and are spaced apart vertically to enable the impaling spindle 44 to pass freely therebetween. The portion of the bracket 498 extending outwardly from the runners 500 is slotted at 502 in alignment with the space therebetween. This is to prevent possible interference between the bracket and the impaling spindle as the same is brought into position at station T.

In order that the stem end trimming knife assembly 468 may be moved inward and outward, yet accommodate itself to pears of various lengths when performing stem end trimming operations, the carriage 464 is resiliently urged inwardly and positively mover outwardly. Accordingly, a tension spring 504, for moving the carriage 464 and, consequently, the stem end trimming knife assembly 468 inward, is stretched between a stud 506 on the carriage body 472 and a lug 508, fixed to the cross strap 460.

The carriage 464 is positively moved outward by a lever 510 (FIG. 18) under the control of a disc cam 512 and is released for inward movement under the action of the spring 504. For this purpose the lever 510 is mounted for pivoting movement by means of a shaft 514, journalled in bearings 516 and 516' on the side plates 450 and 450', respectively, and has upper end portions 518 and 518' which are engaged by the inner sides of the studs 476 and 476', respectively. The cam 512 (FIG. 18) is fixed to a shaft 520 (FIGS. 2 and 18) which is journalled in the frame structure 32 and is driven by a power take-off shaft 522 of the transmission 50 through intermeshing bevel gears 524 and 526 on the shafts 520 and 522, respectively (FIG. 2). In this way, the cam 512 is driven at such a speed as to make six revolutions during each revolution of the rotary table 34 so that the carriages 464 and 464' are released for performance of one stem end trimming operation each time a peeling head 40 arrives at station T. A train 528 of levers and links (FIG. 18) of common construction, connected to the lever 510 and actuated by the rotating cam 512, controls the movement of the carriages 464 and 464'. Thus, during each revolution of the cam 512, the carriages 464 and 464' are first released by the lever 510 for inward movement by the springs 504 and 504' to carry the stem end trimming knife assemblies 468 and 468' inward so that the runners 500 and 500' thereof engage the stem ends of pears advanced by the peeling head 40 as the same approaches station T. The cut off knives 490 and 490' are, thus, spaced inwardly of the pears a predetermined distance from the stem ends thereof. As the peeling head comes into registry with station T and during continued rotation of the pears by the impaling spindles 44 and 44', the stem ends of the pears are severed by the knives 490 and 490' to complete the stem end trimming operation. Thereafter, as the cam 512 continues to rotate, the lever 510 is swung outward to retract the carriages 464 and 464' prior to indexing movement of the peeling head 40 from station T to station D.

*Operation*

The following portion of the description will be set forth with particular reference to FIGURE 24 which illustrates diagrammatically the cams that effecting the various pear peeling operations and the related end trimming operations performed by the machine 30. This figure additionally illustrates the duration of these operations and their relation to each other as well as to the positions of the rotary table 34 throughout one pear peeling and end trimming cycle. It will be assumed that the rotary peelers 64, 66 and 68, 70 have been adjusted to take a shallow or thin peel cut, that the machine 30 is in operation and that the table 34 has just been brought to the position indicated by the 0° line of FIGURE 24, wherein one peeling head 40 (FIGS. 2, 3, 4 and 5) is in registry with station F. The 0° line of FIGURE 24, indicating the beginning of the cycle, has been shown on the cam assembly 340 (FIGS. 10 and 11) and on the cam 442 (FIG. 3) to relate their positions to the diagram. It is to be further assumed that, as yet, no pears have been impaled on the impaling spindles 44 and 44' which are in their pear receiving position at station F and that the various instrumentalities of the peeling head 40 are in the position they will assume immediately preceding the pear peeling and end trimming cycle.

The pear feeding apparatus 62 (FIG. 1), the action of which is coordinated with the positioning of the peeling head 40 at station F, is the first to operate. Pears are fed by the feeding apparatus 62 blossom end first along their stem-blossom axes into predetermined positions (FIG. 20) on the impaling spindles 44 and 44'. This action occurs throughout 10° of rotation of the cam assembly 340 starting after the same has first rotated through approximately 5°. As the pears are impaled, the core material entering the impaling spindles 44 and 44' pushes the rod 316 and 316' inward. The foregoing actions can be clearly understood from FIGURE 24 in connection with the operation of the core ejector apparatus 314. Thus, the levers 320 and 320' are correspondingly swung inward until the cam plate 334 and the lever 320 to which it is attached are in the phantom position, as shown in FIGURE 5, indicating that the pears are fully impaled. When in this position the cam plate 334 is in engagement with the cam follower roller 351 of the continuously rotating cam assembly 340. The advancing roller 351, thus engaging the cam plate 334, advances the arms 320 and 320' and thereby starts to project the rods 316 and 316'. This action continues throughout the next 160° of rotation of the cam assembly 340 to eject the core material from the impaling spindles 44 and 44'.

At the time the pears are fully impaled, the clutch operating cam segment 352, which extends through approximately 80° and has heretofore held the clutch actuating lever 104 in the full line position (FIG. 5) wherein the clutch 102 is disengaged, releases the lever 104. The clutch 102 is thereby engaged and starts the impaling spindles 44 and 44' rotating. The importance of the speed at which the impaling spindles 44 and 44' rotate to the performance of the peeling operation has been emphasized hereinbefore. It is to be noted that the speed with which the impaling spindles 44 and 44' of the present pear preparation machine rotate is substantially the same as the speed of the impaling spindles of the known machine referred to earlier.

After the cam assembly 340 has rotated 5° further or after it has rotated a total of 20°, the table 34 is first indexed to advance the peeling head 40 from station F. At this time the peeling knife assembly lifter cam segment 354, which extends through 160° (FIGS. 5, 10 and 24) moves out of engagement with the roller 238 and releases the peeling knife assembly lifting and control apparatus 220. The peeling knife assemblies 112, 114 and 116, 118 are then lowered by the action of the springs 202 and 202' to bring the rotary peelers 64, 66 and 68, 70, respectively into engagement with the pears at opposite sides thereof. The points of engagement of the rotary peelers with the pears define an imaginary line, indicated by the reference line 530 (FIGS. 20–23) passing through the largest diameter area of the pears at right angles to the stem blossom axes. The rotary peelers bear against the pears lightly but, nevertheless, with sufficient force to assure that the rotary peelers remain securely in peeling engagement with the rotating pears even though their surfaces may have bumps and hollows and may be eccentric with respect to the impaling spindles. It is to be particularly noted for later reference (FIG. 24), that the peeling operation starts at approximately the time the rotary table 34 starts its first increment of indexing movement.

At nearly the same time the rotary peelers 64, 66 and 68, 70 are lowered into peeling engagement with the pears, the uniform rise 358 of the face cam 356, which rise extends through approximately 205°, engages the cam follower roller 284 of the peeling knife assembly lead travel and control apparatus 270 (FIG. 11). The arms 276 and 276' thereof are, thus, pivoted against the urgency of the spring 288 by the uniform rise 358 to thereby advance the rotary peelers 64 and 68 outward toward the stem ends of the pears on the impaling spindles 44 and 44', respectively, while the rotary peelers 66 and 70 are advanced inward thereof. Therefore, since the peeling cutters 154a and 154c and 184b, 184d are being rotated by the drive 81, and the pears at this time are being rotated about their stem-blossom axes by the impaling spindles 44 and 44', the peeling cutters' advance lengthwise of the pears assures that a spiral peel cut will be made along the pears to remove the peel from the same.

Shortly after the start of the peeling operation, i.e., in the order of 8° or 9° thereafter (FIG. 24), the calyx end trimming operation commences, when the valley 444 of the face cam 442 comes into registry with the cam follower roller 438, as may be understood from FIGURE 12. This releases the lever 430 and the slide bar 384 so that the abutments 388 and 388' thereof, against which the arms 382 and 382' are urged by the springs 386 and 386', are also released, thereby enabling the slide bar 384 to move in the direction indicated by the arrow 390 (FIG. 12). The trimming knife assemblies 362 and 362' are, thus, released for movement and are moved by the springs 386 and 386' from their retracted positions (FIGS. 12, 15 and 20) to their projected positions (FIGS. 16 and 21) into calyx-end trimming engagement with the rotating pears. The valley 444 enables the trimming knife assemblies 362 and 362' to remain in engagement with the pears throughout substantially 15° rotation of the cam 442.

It will be noted in FIGURE 21, that the rotary peelers 64, 66 and 68, 70 associated with the impaling spindles 44 and 44', respectively, have now traveled some distance from their initial points of engagement with the pears (FIG. 20) at the largest diameter areas of the pears. This movement of the rotary peelers is toward the stem blossom axes of the pears along oppositely inclined surface portions thereof. The movement of both rotary peelers, associated with each pear, as they peel the bulb portion thereof is constantly from a large diameter area to a smaller diameter area of the pear. This is in the direction in which the rotary peelers are normally urged by the spring 202. Thus, it will appear that the rotary peelers are less apt to gouge and bruise the meat of the pear when descending the curve of the bulb portion than if the rotary peelers are cammed outward from a smaller to a larger diameter area of the pear by the pear itself against the force of the spring 202 while peeling the bulb portion. This latter condition exists in the known machine referred to which employs a single rotary peeler in performing the pear peeling operation.

The pressure exerted or imposed on the pears by the rotary peelers, under the resilient force of the springs 202 and 202' as the rotary peelers advance lengthwise of the pears in the manner described above, tends to stabilize the pears on the impaling spindles against movement axially thereof. It is at this time, while the pears are stabilized against axial movement in either direction, that the calyx-end trimming operations are performed. As the trimming knife assemblies 362 and 362' perform their calyx-end trimming operations the vertical cutting edges 402 of the trimming knives 366 and 366' cut into the calyx-end of the pears to a depth determined by engagement of the thickness gauging surfaces 368 and 368' with the pears. As the peel is thus removed from the calyx-ends of the pears, the cutting edges 414 of the lips 412 neatly cut off, adjacent the axes of the pears, the peel severed therefrom by the cutting edges 402.

The planar surface portion 440 of the face cam 442, following the valley 444, engages the roller 438 and pivots the lever 430 (FIG. 12) clockwise thereby retracting the trimming knife assemblies 362 and 362'. Any peel caught on the cutting edges 402 or between the same and the associated surfaces 410 will be removed therefrom by the tongues 418 and 418' as may be understood from FIGURES 14 and 15.

The peeling actions continue, as described above, throughout four intermittent indexing movements of the table 34 (FIG. 24) before the peeling head 40 arrives at station T, at which time the peeling and calyx-end trimming operations have been completed. During the third indexing movement of the table 34, however, the cores have been fully ejected from the impaling spindles 44 and 44' at the time the cam assembly 340 has rotated through 175°.

At 230° of rotation of the cam assembly 340, i.e., 10° of rotation before the peeling head 40 is moved by the table 34 into registry with station T and following the position of the rotary peelers shown in FIGURE 22, the cam segment 354 engages the cam follower roller 238 to pivot the peeling knife assembly lifting and control device 220 against the force of the springs 202 and 202'. This lifts the rotary peelers 64, 66 and 68, 70 out of peeling engagement with the pears, as shown in phantom line (FIG. 23) and ends the peeling operation.

At approximately 233° of rotation of the cam assembly 340 and following the rotary peeler lifting operation just described, the step 360 of the face cam 356 moves into engagement with the cam follower roller 284. This releases the rotary peelers 64, 66 and 68, 70 for limited return movement lengthwise of the impaling spindles by the spring 288 toward reference line 530, as shown in full lines, FIGURE 23. The lifting and partial return of the rotary peelers to their original positions assures that they will not interfere with the stem end trimming apparatus which is next to come into operation.

As pointed out earlier, the peeling operation starts soon after the start of the first indexing movement of the rotary table 34. This is shown in FIGURE 24 to commence after approximately 10° rotation of the cam assembly 340 following the initial movement of the table, when the cam segment 354 releases the rotary peelers 64, 66 and 68, 70 for movement from the raised to the lowered position into peeling engagement with the pears. Subsequently, after the cam segment 354 has turned in the order of 200° additionally it is effective to lift the rotary peelers from the lowered to the raised position, out of engagement with the pears. This, of course, must be done at such a time in relation to the start of the stem end trimming operation that the cut off knives 490 and 490' will be in their stem end trimming positions prior to registry of the peeling head 40 with station T. It will be clear, therefore, that the entire peeling operation is performed between the time the peeling head 40 leaves station F and before it arrives at station T, a distance in the order of 200° of travel of the rotary table 34. This distance remains substantially the same as the distance within which the peeling operation was performed in the known machine referred to earlier. Therefore, both the duration of the peeling operation and the speed at which the impaling spindles 44 and 44' rotate the pears remain substantially the same as in the machine referred to above.

It will be clear that the uniform rise 358 of the cam 356 advances the rotary peelers associated with a particular impaling spindle 44 and 44' in opposite directions, lengthwise of the pears thereon, from the reference line 530 (FIG. 20), throughout the entire time available in which to perform the peeling operation, before the peeling head 40 reaches station T. Because of this, separate areas of the same pear are peeled simultaneously by different rotary peelers. Thus, each of the two rotary peelers, acting on a pear rotating at substantially the same speed as the pears peeled in the known machine, has only a portion of a pear to peel and the advance of each rotary peeler lengthwise of the pear can be relatively slow, i.e., the lead travel of the rotary peelers during one revolution of a pear is relatively short. Therefore, since the lead travel is short the rotary peelers can be adjusted to take a relatively shallow or thin peel cut, to thereby limit the width of the same to little more than the lead travel in one revolution of the pear. For these reasons, the spiral cut taken from a particular pear by the apparatus of the present invention is relatively narrow, and, consequently, relatively thin or shallow as compared to that taken from a pear peeled in the known machine. Since a narrow and a shallow peel cut taken by the apparatus of the present invention leaves the surface of the pears with grooves so nearly imperceptable that the pear is nearly smooth, the quality of the pears prepared in the present machine is of relatively high grade. Moreover, since the thin peel cut from the pears by the present machine is less wasteful of fruit than is the thick peel cut from the pears peeled by the known machine, a real saving in fruit is made by the use of the present machine.

At the start of the rotary peeler lifting operation, the cam 512 (FIGS. 18 and 24) releases the stem end trimming knife carriages 464 and 464' for inward movement by the springs 504 and 504'. The runners 500 and 500' of the stem end trimming knife assemblies 468 and 468' are, thus, brought into engagement with the stem ends of the pears (FIG. 23) and thereby position the knives 490 and 490' in predetermined spaced relation inwardly from the stem ends of the pears. During the final indexing movement of the peeling head 40 into registry with station T the knives 490 and 490' cut through the necks of the pears up to the rotating impaling spindles 44 and 44' to complete the stem end trimming operation.

Following the time the peeling head 40 comes into registration with station T and after approximately half the time the same remains in registry therewith, the cam 512 retracts the stem end trimming carriages 464 and 464' (see FIG. 18). Any obstruction by the stem and trimming apparatus 72 to the advance of the peeling head 40 is, thus, removed before initiation of the fifth indexing movement of the table 34. The fifth indexing movement of the peeling head 40 advances the same into registry with station D. Approximately 10° of rotation of the cam assembly 340 following the start of the fifth indexing movement of the table, when the cam assembly 340 has rotated in the order of 265°, the step 360 of the cam 356 moves out of engagement with the cam follower roller 284. Thus, as understood by reference to FIGURES 5 and 11, the peeling knife assembly lead travel and control apparatus 270 is released for further return movement by the spring 288 until the arm 286 engages the limit stop 290 (FIG. 5). Since the rotary peelers have already been lifted, this action returns the rotary peelers 64, 66 and 68, 70 into their positions shown in FIGURE 20 in alignment with the reference line 530.

Next the clutch 102 is disengaged and rotation of the impaling spindles 44 and 44' is stopped after a total of 295° rotation of the cam assembly 340, when the cam segment 352 engages the cam follower roller 108 and pivots the clutch control lever 104 from the phantom to the full line position (FIG. 5). Thus, the fully peeled and end trimmed pears stop rotating just before the peeling head 40, after 300° of rotation of the cam assembly 340, is moved by the table 34 into registration with station D. Following the removal of the peeled and end trimmed pears at station D from the impaling spindles 44 and 44' by the discharge apparatus 84, the peeling head 40 is indexed the sixth and final time into registry with station F after 360° of rotation of the cam assembly 340 and the associated cam 442 to complete one pear peeling and end trimming cycle performed throughout one revolution of the table 34.

It will be apparent from the foregoing description that the present invention, directed to apparatus for peeling and end trimming pears and to the method carried out thereby, makes it possible to peel a pear completely while taking a narrow and, consequently, a shallow or thin peel cut from the pear as it is rotated at a certain speed in the same length of time previously required while taking a wide and, consequently, a deep or thick peel cut from a pear rotating at the same speed. It is, therefore, possible to peel and end trim pears in such a way as to obtain a product of relatively higher grade than heretofore possible by use of the known machine mentioned earlier. Furthermore, this is done with a saving in fruit, formerly wasted. The improved results obtained in practicing the present invention have been shown to result in part from performing two peeling operations simultaneously on separate parts of a pear, which operations proceed in opposite directions lengthwise of the pear during relative rotation between the pear and the peeling means about the stem-blossom axis of the pear. For this latter reason, the pears are stabilized against axial movement during the peeling operation. Additionally, since these two peeling operations proceed simultaneously along oppositely sloping surface portions during the calyx trimming operation there is little or no tendency for the pears to shift axially during performance of this operation since, at the time, the pears are stabilized against such movement. Moreover, gouging and bruising of the pears by the peeling cutters are avoided during peeling, since the two peeling operations proceed from adjacent the largest diameter area of the pear along oppositely inclined surface areas thereof toward the stem-blossom axis of the pear. The present calyx-end trimming knife assembly assures uninterrupted service since the trimming knife cannot become fouled by peel.

While a particular embodiment of the present invention has been shown and described it will be understood that both the apparatus and the method carried out thereby, as set forth, are capable of modification and variation without departing from the principles of the invention and the scope of the invention should be limited only by the scope and proper interpretation of the claims appended hereto.

The invention having thus been described, what is believed to be new and desired to be protected by Letters Patent is:

I claim:

1. In a pear preparation machine, the combination of a support member, pear holding means rotatably mounted on said support member and adapted to retain a pear against rotation about its stem-blossom axis relatively to said pear holding means, two peeling knife assemblies each including a peeling cutter, said peeling knife assemblies being mounted on said support member for independent movement relatively thereto, means resiliently urging said peeling knife assemblies toward a pear retained by said pear holding means to dispose said peeling cutters in resilient peeling engagement with the pear, means effecting relative rotation between said support member and said pear holding means about the stem-blossom axis of the pear, and peeling knife assembly moving means for moving said peeling knife assemblies relatively to said support member in opposite directions lengthwise of the pear to advance the peeling cutters thereof along oppositely sloping surface portions of the pear respectively during relative rotation between said pear holding means and said support member to peel the pear, any action of either peeling cutter thus disposed in resilient peeling engagement with the pear and tending to move the pear along its stem-blossom axis relatively to said pear holding means during the peeling action being counteracted by the action of the other peeling cutter, said peeling cutters being moved simultaneously in opposite directions along the large diameter portion of the pear, calyx end trimming means mounted on said support member for movement relatively to the pear into and out of engagement with the calyx end of the pear, and means for moving said calyx end trimming means into engagement with the pear during the time the peeling cutters are moving in opposite directions along the large diameter portion of the pear to thereby stabilize the pear against possible axial movement caused by the action of said calyx end trimming means.

2. In a pear preparation machine, the combination of a support member, pear holding means rotatably mounted on said support member and adapted to retain a pear against rotation about its stem-blossom axis relatively to said pear holding means, two peeling knife assemblies each including a peeling cutter, said peeling knife assemblies being mounted on said support member for independent movement relatively thereto, means resiliently urging said peeling knife assemblies toward a pear retained by said pear holding means to dispose said peeling cutters in resilient peeling engagement with the pear, means effecting relative rotation between said support member and said pear holding means about the stem-blossom axis of the pear, and peeling knife assembly moving means for moving said peeling knife assemblies relatively to said support member in opposite directions lengthwise of the pear to advance the peeling cutters thereof along oppositely sloping surface portions of the pear respectively during relative rotation between said pear holding means and said support member to peel the pear, any action of either peeling cutter thus disposed in resilient peeling engagement with the pear and tending to move the pear along its stem-blossom axis relatively to said pear holding means during the peeling action being counteracted by the action of the other peeling cutter, means for feeding a pear into predetermined position on said pear holding means, said peeling knife assembly moving means being adapted to position said peeling knife assemblies so that the peeling cutters thereof are opposite each other adjacent a particular circumference of the pear substantially at its largest diameter, and peeling knife assembly control means operable when said peeling knife assemblies are positioned adjacent said particular circumference to move said peeling knife assemblies so that the peeling cutters thereof are in resilient engagement with the pear, said peeling knife assembly moving means being further effective to advance said peeling knife assemblies in opposite directions from their positions with the peeling cutters thereof on said circumference to advance the peeling cutters along oppositely sloping surface areas of the pear toward the stem-blossom axis of the pear to peel the pear calyx end trimming means mounted on said support structure for movement relatively to the pear on said pear holding means into and out of engagement with the calyx end of the pear, and means for moving said calyx end trimming means into engagement with the calyx end of the pear during the time said peeling knife assemblies are moving the peeling cutters thereof along the large diameter portion of the pear from said particular circumference toward the stem-blossom axis of the pear.

3. In a pear preparation machine, the combination of a support member, pear holding means rotatably mounted on said support member and adapted to retain a pear against rotation about its stem-blossom axis relatively to said pear holding means, two peeling knife assemblies each including a peeling cutter, said peeling knife assemblies being mounted on said support member for independent movement relatively thereto, means resiliently urging said peeling knife assemblies toward a pear retained by said pear holding means to dispose said peeling cutters in resilient peeling engagement with the pear, means effecting relative rotation between said support member and said pear holding means about the stem-blossom axis of the pear, and peeling knife assembly moving means for moving said peeling knife assemblies relatively to said support member in opposite directions lengthwise of the pear to advance the peeling cutters thereof along oppositely sloping surface portions of the pear respectively during relative rotation between said pear holding means and said support member to peel the pear, any action of either peeling cutter thus disposed in resilient peeling engagement with the pear and tending to move the pear along its stem-blossom axis relatively to said pear holding means during the peeling action being counteracted by the action of the other peeling cutter, said pear holding means being a pear impaling spindle rotatably mounted on said support structure and adapted to hold a pear impaled thereon against rotation relatively thereto, said means for effecting relative rotation between said support member and said pear holding means being a drive means operable to rotate said impaling spindle, means for impaling a pear in predetermined position along its stem-blossom axis on said impaling spindle, said peeling knife assembly moving means being adapted to move said peeling knife assemblies longitudinally of said impaling spindle into positions with the peeling cutters thereof adjacent the largest diameter area of a pear impaled in predetermined position on said impaling spindle, said resilient means being a spring for resiliently urging said peeling knife assemblies transversely of said impaling spindle to move said peeling cutters into peeling engagement with the pear thereon, said peeling knife assembly moving means also being effective to move said peeling knife assemblies in oppoosite directions longitudinally of said impaling spindle from positions wherein said peeling cutters are adjacent the largest diameter area of the pear to advance the peeling cutters in opposite directions along the pear being rotated by said impaling spindle to completely peel the pear, a calyx end trimming knife movable on said support structure into and out of trimming engagement with the calyx end of the pear, and calyx end trimming knife moving means synchronized in its operation with said peeling knife assembly moving means and adapted to move said calyx end trimming knife into trimming engagement with the calyx end of the pear during initial movement of said peeling knife assemblies during the pear peeling operation performed by the cutters thereof.

4. In a pear preparation machine, the combination of a support member, pear holding means rotatably mounted on said support member and adapted to retain a pear against rotation about its stem-blossom axis relatively to said pear holding means, two peeling knife assemblies each including a peeling cutter, said peeling knife assemblies being mounted on said support member for independent movement relatively thereto, means resiliently urging said peeling knife assemblies toward a pear retained by said pear holding means to dispose said peeling cutters in resilient peeling engagement with the pear, means effecting relative rotation between said support member and said pear holding means about the stem-blossom axis of the pear, and peeling knife assembly moving means for moving said peeling knife assemblies relatively to said support member in opposite directions lengthwise of the pear to advance the peeling cutters thereof along oppositely sloping surface portions of the pear respectively during relative rotation between said pear holding means and said support member to peel the pear, any action of either peeling cutter thus disposed in resilient peeling engagement with the pear and tending to move the pear along its stem-blossom axis relatively to said pear holding means during the peeling action being counteracted by the action of the other peeling cutter, said pear holding means being a pear impaling spindle rotatably mounted on said support structure and adapted to hold a pear impaled thereon against rotation relatively thereto, said means for effecting relative rotation between said support member and said pear holding means being a drive means operable to rotate said impaling spindle, means for impaling a pear in predetermined position along its stem-blossom axis on said impaling spindle, said peeling knife assembly moving means being adapted to move said peeling knife assemblies longitudinally of said impaling spindle into positions with the peeling cutters thereof adjacent the largest diameter area of a pear impaled in predetermined position on said impaling spindle, said resilient means being a spring for resiliently urging said peeling knife assemblies transversely of said impaling spindle to move said peeling cutters into peeling engagement with the pear thereon, said peeling knife assembly moving means also being effective to move said peeling knife assemblies in oppoosite directions longitudinally of said impaling spindle from positions wherein said peeling cutters are adjacent the largest diameter area of the pear to advance the peeling cutters in opposite directions along the pear being rotated by said impaling spindle to completely peel the pear, first cam means connected to said peeling knife assemblies and adapted to move the same longitudinally of said impaling spindle into said positions with the peeling cutters thereof adjacent the largest diameter area of the pear, and second cam means connected to said peeling knife assemblies and adapted to positively move said peeling knife assemblies away from said impaling spindle against the urgency of said spring when the peeling cutters are adjacent the ends of the pear and to release said peeling knife assemblies for movement by said spring toward said impaling spindle when said peeling cutters are adjacent the largest diameter area of the pear, said first cam means also being adapted to move said peeling knife assemblies in said opposite direction along the pear being rotated by said impaling spindle for the peeling cutters thereof to completely peel the pear.

5. In a pear preparation machine, the combination comprising a support structure, a pear impaling spindle rotatably mounted on said support structure and adapted to receive a pear along its stem-blossom axis and to hold the pear against rotation relatively to said impaling spindle, means to rotate said impaling spindle, a peeling knife assembly including a peeling cutter, said peeling knife assembly being mounted on said support structure for movement lengthwise of said pear impaling spindle and for movement transversely of said pear impaling spindle, peeling knife assembly moving means for advancing said peeling knife assembly with said cutter toward the stem end of the pear lengthwise of the pear on said impaling spindle to a location adjacent the stem end of the pear with said peeling cutter in peeling engagement with the pear, stem end trimming means mounted on said support structure for movement into a position to trim the stem end of the pear on said pear impaling spindle, peeling knife assembly control means for moving said peeling knife assembly transversely of said pear impaling spindle outward therefrom when said cutter reaches a location adjacent the stem end of the pear to remove said cutter from its position in peeling engagement with the pear to provide unobstructed access to the stem end of the pear by said stem end trimming means, and means synchronized with said peeling knife assembly control means for moving said stem end trimming means into stem end trimming position upon outward movement of said peeling knife assembly.

6. In a pear preparation machine the combination of a support member, a pear impaling spindle rotatably mounted on said support member, said pear impaling spindle being adapted to receive a pear along its stem-blossom axis and arranged to retain said pear against rotation relatively to said impaling spindle, two peeling knife assemblies each including a peeling cutter, said peeling knife assemblies being mounted on said support member for independent movement relatively thereto toward and away from the pear transversely of said impaling spindle as well as along the pear, means for moving said peeling knife assemblies traversely of said impaling spindle toward the pear to dispose said peeling cutters in peeling engagement therewith and for moving said peeling knife assemblies in opposite directions lengthwise of the pear to advance said peeling cutters along the pear, and means effecting relative rotation between said support member and said impaling spindle so as to peel separate portions of the pear during relative rotation between the pear impaled on said impaling spindle and the peeling cutters of said peeling knife assemblies on said support member during movement of said peeling knife assemblies in opposite directions lengthwise of the pear to completely peel the pear, said pear impaling spindle being adapted to receive a pear in predetermined position along its stem-blossom axis, means for feeding a pear into said predetermined position on said impaling spindle; said means for moving said peeling knife assemblies transversely of said impaling spindle and in opposite directions lengthwise of the pear including first means operable to move said peeling knife assemblies toward and from a pear impaled in said predetermined position on said impaling spindle to move said peeling cutters into peeling engagement with the pear and to move said peeling cutters into positions spaced from the pear, and second means coordinated with said first means and operable to move said peeling knife assemblies in opposite directions lengthwise of the pear, said first means being arranged to move said peeling knife assemblies toward the pear from positions in spaced relation thereto to dispose said peeling cutters in peeling engagement with the pear when said peeling knife assemblies have been moved by said second means into positions wherein said peeling cutters are adjacent the largest diameter area of the pear, said second means thereafter being effective to move said peeling knife assemblies in opposite directions lengthwise of the pear whereby said peeling cutters are moved toward opposite ends of the pear, respectively, to peel separate portions of the pear during relative rotation between the pear impaled on said impaling spindle and said support member to completely peel the pear.

7. The combination set forth in claim 6 including first resilient means urging said two peeling knife assemblies toward the pear transversely of said spindle to dispose said peeling cutters in peeling engagement with the pear, second resilient means urging said two peeling knife assemblies lengthwise of the pear in opposite directions toward opposite ends thereof, said first means for moving said peeling knife assemblies including control and lifting apparatus for lifting said peeling knife assemblies to thereby raise said peeling cutters against the urgency of said first resilient means into positions spaced from the pear on said impaling spindle and for controlling the movement of said peeling knife assemblies toward the pear under the influence of said first resilient means to thereby dispose said peeling cutters in peeling engagement with the pear, said second means for moving said peeling knife assemblies lengthwise of the pear including lead travel and control apparatus for moving said peeling knife assemblies in opposite directions lengthwise of the pear against the urgency of said second resilient means, and means for coordinating the action of said control and lifting apparatus and said lead travel and control apparatus for moving said peeling knife assemblies into positions with the peeling cutters thereof spaced from said impaling spindle wherein said peeling cutters are adjacent the largest diameter area of a pear in predetermined position on said impaling spindle while said peeling cutters are in positions spaced from said impaling spindles, for controlling the movement of siad peeling knife assemblies under the influence of said first resilient means to move said peeling cutters into peeling engagement with the pear adjacent its area of largest diameter, and to thereafter positively advance said peeling knife assemblies against the urgency of said second resilient means in opposite directions lengthwise of the pear to thereby move said two peeling cutters in opposite directions therealong from the largest diameter area of the pear to the opposite ends of the pear to separately peel different areas of the pear to completely peel the same.

8. The method of peeling a pear including the steps of disposing two peeling cutters in resilient peeling engagement with a pear at separate locations thereon under substantially equal forces directed toward the stem-blossom axis of the pear, effecting relative rotation between the pear and the two peeling cutters about the stem-blossom axis of the pear thereby severing the peel from the pear, and advancing said peeling cutters in opposite directions lengthwise of the pear along surface areas of the pear which slope in opposite directions toward the stem-blossom axis of the pear, said peeling cutters imposing on the pear substantially equal and opposite forces to stabilize the pear against movement along its stem-blossom axis, and trimming the peel from the calyx end of the pear while said peeling cutters are advancing along said oppositely sloping pear surfaces and said pear is stabilized against movement along its stem-blossom axis.

References Cited
UNITED STATES PATENTS

| | | | |
|---|---|---|---|
| 284,823 | 9/1883 | Cottrell | 146—43 |
| 1,747,706 | 2/1930 | Goranson et al. | 146—43 |
| 1,850,633 | 3/1932 | Mehserle | 146—43 X |
| 1,872,731 | 8/1932 | Goranson et al. | 146—43 |
| 2,740,441 | 4/1956 | Coons | 146—43 X |
| 2,925,839 | 2/1960 | Mason | 146—43 |

W. GRAYDON ABERCROMBIE, *Primary Examiner.*